United States Patent
Ye et al.

(10) Patent No.: US 12,402,161 B2
(45) Date of Patent: Aug. 26, 2025

(54) TRIGGERING AND SIGNALING OF INTER-UE COORDINATION MESSAGE

(71) Applicant: Apple Inc., Cupertino, CA (US)

(72) Inventors: Chunxuan Ye, San Diego, CA (US); Wei Zeng, San Diego, CA (US); Dawei Zhang, Saratoga, CA (US); Hong He, Cupertino, CA (US); Haitong Sun, Irvine, CA (US); Weidong Yang, San Diego, CA (US); Oghenekome Oteri, San Diego, CA (US); Sigen Ye, Whitehouse Station, NJ (US); Chunhai Yao, Beijing (CN); Yushu Zhang, Beijing (CN); Huaning Niu, San Jose, CA (US); Jia Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 340 days.

(21) Appl. No.: 17/438,961

(22) PCT Filed: Oct. 15, 2020

(86) PCT No.: PCT/CN2020/121097
§ 371 (c)(1),
(2) Date: Sep. 14, 2021

(87) PCT Pub. No.: WO2022/077326
PCT Pub. Date: Apr. 21, 2022

(65) Prior Publication Data
US 2022/0322359 A1    Oct. 6, 2022

(51) Int. Cl.
*H04W 72/23* (2023.01)
*H04W 72/0446* (2023.01)
(Continued)

(52) U.S. Cl.
CPC ..... *H04W 72/563* (2023.01); *H04W 72/0446* (2013.01); *H04W 76/14* (2018.02); *H04W 92/18* (2013.01)

(58) Field of Classification Search
CPC ....... H04W 72/23; H04W 4/02; H04W 88/02; H04W 72/0446; H04W 24/10; H04W 72/0453; H04W 72/21; H04W 76/10
See application file for complete search history.

(56) References Cited

U.S. PATENT DOCUMENTS 11,166,292 B2 * 11/2021 Huang ................ H04W 72/56
2018/0332585 A1 * 11/2018 Faurie ............... H04W 72/0453
(Continued)

FOREIGN PATENT DOCUMENTS

| CN | 110447294 | 11/2019 |
|----|-----------|---------|
| CN | 110972101 A | 4/2020 |

(Continued)

OTHER PUBLICATIONS

International Search Report for PCT Patent Application No. PCT/CN2020/121097, mailed Jul. 8, 2021.
(Continued)

*Primary Examiner* — Sai Aung
(74) *Attorney, Agent, or Firm* — Kowert, Hood, Munyon, Rankin & Goetzel, P.C.

(57) ABSTRACT

Apparatuses, systems, and methods for triggering and signaling of an inter-UE coordination message. A coordinating UE may determine to transmit, to a source UE, a set of resources for the source UE to use for sidelink communications. The determination may be based, at least in part, on an occurrence of at least one condition. The at least one condition may include the coordinating UE receiving a sidelink coordination request message form the source UE, the coordinating UE detecting a resource reservation colli-
(Continued)

sion between the source UE and a destination UE, and/or the coordinating UE detecting a half-duplex restriction at the source UE or the destination UE. The coordinating UE may transmit an inter-UE coordination message to the source UE. The inter-UE coordination message may include at least an indication of the set of resources.

20 Claims, 12 Drawing Sheets

(51) Int. Cl.
*H04W 72/56* (2023.01)
*H04W 72/563* (2023.01)
*H04W 76/14* (2018.01)
*H04W 92/18* (2009.01)

(56) References Cited

U.S. PATENT DOCUMENTS

| | | | | |
|---|---|---|---|---|
| 2019/0075447 | A1* | 3/2019 | Lee | H04W 68/02 |
| 2020/0196255 | A1* | 6/2020 | Cheng | H04L 5/0064 |
| 2020/0196353 | A1 | 6/2020 | Zhang | |
| 2021/0105789 | A1* | 4/2021 | Freda | H04W 72/56 |
| 2021/0204307 | A1* | 7/2021 | Lee | H04W 76/14 |
| 2021/0306824 | A1* | 9/2021 | Li | H04W 4/40 |
| 2021/0314750 | A1* | 10/2021 | Nguyen | H04W 72/20 |
| 2021/0410129 | A1* | 12/2021 | Freda | H04W 72/543 |
| 2022/0007403 | A1* | 1/2022 | Li | H04W 72/20 |
| 2022/0070879 | A1* | 3/2022 | Ryu | H04W 72/20 |
| 2022/0322359 | A1* | 10/2022 | Ye | H04W 72/563 |
| 2022/0408412 | A1* | 12/2022 | Lee | H04L 1/1893 |
| 2023/0309065 | A1* | 9/2023 | Leon Calvo | H04W 72/563 370/329 |
| 2023/0389002 | A1* | 11/2023 | Hui | H04W 72/25 |

FOREIGN PATENT DOCUMENTS

| | | |
|---|---|---|
| CN | 111418190 A | 7/2020 |
| CN | 111565373 | 8/2020 |
| WO | 2018190604 A1 | 10/2018 |

OTHER PUBLICATIONS

Extended European Search Report for EP Patent Application No. 20957106.6; Oct. 11, 2023.
LG Electronics "Summary for AI 8.11.2.2 Feasibility and benefits for mode 2 enhancements"; 3GPP TSG RAN WG1 #102-e R1-2007412; Aug. 17, 2020.
Fujitsu "Considerations on inter-UE coordination for mode 2 enhancements"; 3GPP TSG RAN WG1 #102-e R1-2005546; Aug. 17, 2020.
Ericsson "Feasibility and benefits of mode 2 enhancements for inter-UE coordination"; 3GPP TSG-RAN WG1 Meeting #102-e R1-2006445; Aug. 17, 2020.
Office Action for KR 10-2023-7012638; May 27, 2025.
Qualcomm "Reliability and Latency Enhancements for Mode 2" 3GPP TSG RAN WG1 Meeting #102-e R1-2006829; Aug. 17, 2020.
Notification of Grant for CN 202080106217.4; Jun. 18, 2025.

* cited by examiner

TRIGGERING AND SIGNALING OF INTER-UE COORDINATION MESSAGE

PRIORITY CLAIM INFORMATION

This application is a national stage application of International Application No. PCT/CN2020/121097, filed on Oct. 15, 2020, titled "Triggering and Signaling of Inter-UE Coordination Message", which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The invention relates to wireless communications, and more particularly to apparatuses, systems, and methods for triggering and signaling of an inter-UE coordination message, e.g., for V2X Mode 2 resource allocation.

DESCRIPTION OF THE RELATED ART

Wireless communication systems are rapidly growing in usage. One proposed use of wireless communications is in vehicular applications, particularly in V2X (vehicle-to-everything) systems. V2X systems allow for communication between vehicles (e.g., via communications devices housed in or otherwise carried by vehicles), pedestrian UEs (including UEs carried by other persons such as cyclists, and so forth), and other wireless communications devices for various purposes, such as to coordinate traffic activity, facilitate autonomous driving, and perform collision avoidance.

The increased communication requirements of certain V2X systems may strain the power and resource capabilities of portable, battery-powered UE devices. In addition, some UEs are more power limited than others and communicating with a host of UEs may present decreased battery life, increased latency, and degraded communication issues. Accordingly, improvements in the field would be desirable.

SUMMARY

Embodiments relate to wireless communications, including apparatuses, systems, and methods for triggering and signaling of an inter-UE coordination message, e.g., for V2X Mode 2 resource allocation.

For example, in some embodiments, a user equipment device (UE), such as UE 106, may be configured to determine to transmit, to a first UE (e.g., a neighboring UE), a set of resources for the first UE to use for sidelink communications (e.g., to use for transmissions to the UE and/or to another neighboring UE). The determination may be based, at least in part, on an occurrence of at least one condition. The at least one condition may include any, any combination of, and/or all of (e.g., at least one of and/or one or more of) the UE receiving, from the first UE, a sidelink coordination request message (e.g., the inter-UE coordination message may be transmitted in response to receiving the sidelink coordination message), the UE detecting a resource reservation collision between the first UE and a second UE, and/or the UE detecting of a half-duplex restriction at the first UE or the second UE. The UE may also be configured to transmit, to the first UE, an inter-UE coordination message. The inter-UE coordination message may include at least an indication of the set of resources. Transmitting the inter-UE coordination message may include any, any combination of, and/or all of (e.g., at least one of and/or one or more of) the UE periodically broadcasting the inter-UE coordination message, periodically groupcasting the inter-UE coordination message, and/or periodically unicasting the inter-UE coordination message.

In some embodiments, the set of resources may be indicated via one or more bitmaps, e.g., included in the inter-UE coordination message. In some embodiments, a bit within a bitmap may indicate availability of a resource within the set of resources as available or unavailable. Additionally, the bit within a bitmap may correspond to a time slot and sub-channel combination. In some embodiments, more than one bit within a bitmap may indicate a level of availability of a resource within the set of resources. Additionally, bits may correspond to a time slot and sub-channel combination. Further, the level of availability of a resource may include one or more of available, available with restrictions, or unavailable.

In some embodiments, the set of resources may be indicated via a bitmap that may include a first portion and a second portion. For example, bits within the first portion may indicate whether a time slot includes available sub-channels and bits within the second portion may indicate available sub-channels for time slots with available sub-channels (e.g., as indicated in the first portion). Availability of each sub-channel within a time slot may be indicated via a bit, where the bit indicates a sub-channel as available or unavailable. Alternatively, a level of availability of each sub-channel within a time slot may be indicated via more than one bit, where levels of availability may include available, available with restrictions, or unavailable.

In some embodiments, the set of resources may be indicated via an indication of a number of available resources within the set of resources and/or an indication of a time-frequency of available resources. The time-frequency of available resources may be independently encoded resource indications or jointly encoded resource indications. The independently encoded resource indications may include a time gap between an indicated resource and the inter-UE coordination message and a sub-channel index of the indicated resource. The jointly encoded resource indications may include a time resource indication value (TRIV) of time gaps between indicated resources and the inter-UE coordination message and a frequency resource indication value (FRIV) of sub-channel indices.

The techniques described herein may be implemented in and/or used with a number of different types of devices, including but not limited to unmanned aerial vehicles (UAVs), unmanned aerial controllers (UACs), a UTM server, base stations, access points, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
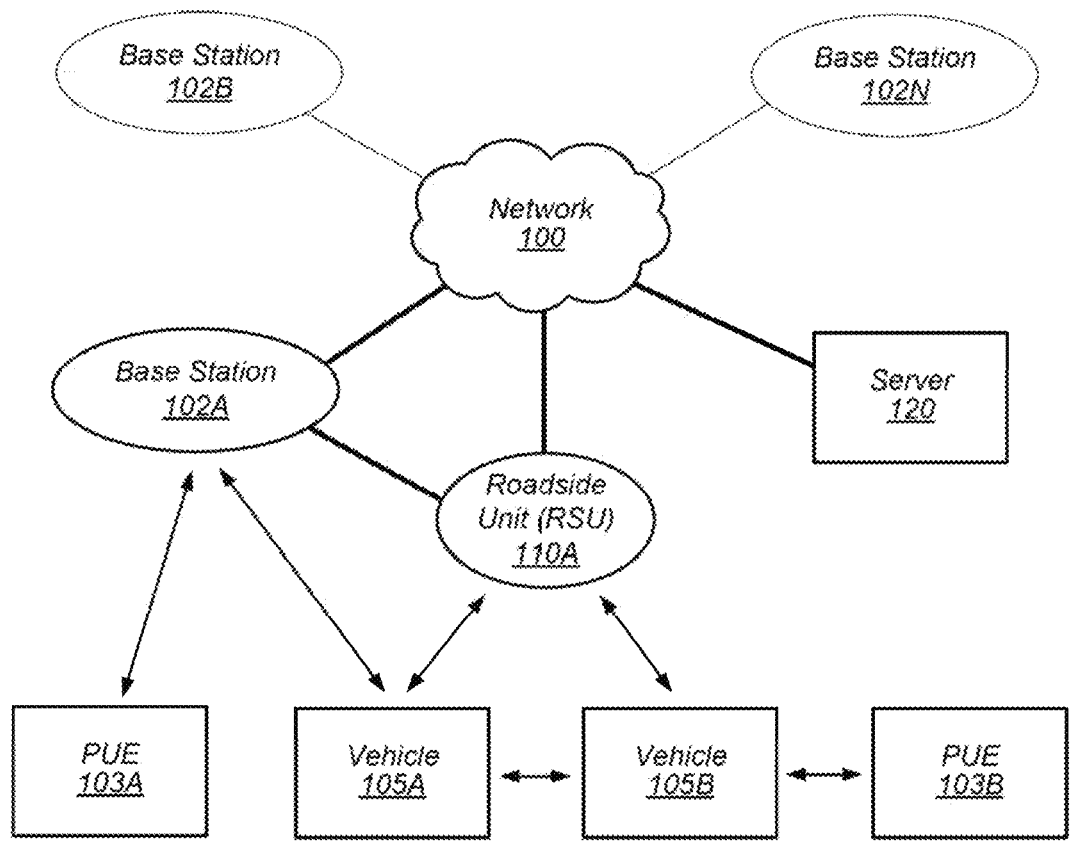
FIG. 1 illustrates an example vehicle-to-everything (V2X) communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC/5GCN: 5G Core Network
IE: Information Element
CE: Control Element
MAC: Medium Access Control
RRC: Radio Resource Control Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, and so forth; a non-volatile memory such as a Flash, magnetic media, e.g., a hard drive, or optical storage; registers, or other similar types of memory elements, and so forth. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Device—as used herein, may refer generally in the context of V2X systems to devices that are associated with mobile actors or traffic participants in a V2X system, e.g., mobile (able-to-move) communication devices such as vehicles and pedestrian user equipment (PUE) devices, as opposed to infrastructure devices, such as base stations, roadside units (RSUs), and servers.

Infrastructure Device—as used herein, may refer generally in the context of V2X systems to certain devices in a V2X system that are not user devices, and are not carried by traffic actors (e.g., pedestrians, vehicles, or other mobile users), but rather that facilitate user devices' participation in the V2X network. Infrastructure devices include base stations and roadside units (RSUs).

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Pedestrian UE (PUE) Device—a user equipment (UE) device as regarded in the context of V2X systems that may be worn or carried by various persons, including not only pedestrians in the strict sense of persons walking near roads, but also certain other peripheral or minor participants, or potential participants, in a traffic environment. These include stationary persons, persons not on vehicles who may not necessarily be near traffic or roads, persons jogging, running, skating, and so on, or persons on vehicles that may not substantially bolster the UE's power capabilities, such as bicycles, scooters, or certain motor vehicles.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, and so forth). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, and so forth.

Band—The term "band" has the full breadth of its ordinary meaning, and at least includes a section of spectrum (e.g., radio frequency spectrum) in which channels are used or set aside for the same purpose.

Wi—Fi—The term "Wi-Fi" (or WiFi) has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

3GPP Access—refers to accesses (e.g., radio access technologies) that are specified by 3GPP standards. These accesses include, but are not limited to, GSM/GPRS, LTE, LTE-A, and/or 5G NR. In general, 3GPP access refers to various types of cellular access technologies.

Non-3GPP Access—refers any accesses (e.g., radio access technologies) that are not specified by 3GPP standards. These accesses include, but are not limited to, WiMAX, CDMA2000, Wi-Fi, WLAN, and/or fixed networks. Non-3GPP accesses may be split into two categories, "trusted" and "untrusted": Trusted non-3GPP accesses can interact directly with an evolved packet core (EPC) and/or a 5G core (5GC) whereas untrusted non-3GPP accesses interwork with the EPC/5GC via a network entity, such as an Evolved Packet Data Gateway and/or a 5G NR gateway. In general, non-3GPP access refers to various types on non-cellular access technologies.

Automatically—refers to an action or operation performed by a computer system (e.g., software executed by the computer system) or device (e.g., circuitry, programmable hardware elements, ASICs, and so forth), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, and so forth) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112 (f) interpretation for that component.

FIG. 1: V2X Communication System

FIG. 1 illustrates an example vehicle-to-everything (V2X) communication system, according to some embodiments. It is noted that the system of FIG. 1 is merely one example of a possible system, and that features of this disclosure may be implemented in any of various systems, as desired.

Vehicle-to-everything (V2X) communication systems may be characterized as networks in which vehicles, UEs, and/or other devices and network entities exchange communications in order to coordinate traffic activity, among other possible purposes. V2X communications include communications conveyed between a vehicle (e.g., a wireless device or communication device constituting part of the vehicle, or contained in or otherwise carried along by the vehicle, including a UE) and various other devices. V2X communications include vehicle-to-pedestrian (V2P), vehicle-to-infrastructure (V2I), vehicle-to-network (V2N), and vehicle-to-vehicle (V2V) communications, as well as communications between vehicles and other possible network entities or devices. V2X communications may also refer to communications between other non-vehicle devices participating in a V2X network for the purpose of sharing V2X-related information.

V2X communications may, for example, adhere to 3GPP Cellular V2X (C-V2X) specifications, or to one or more other or subsequent standards whereby vehicles and other devices and network entities may communicate. V2X communications may utilize both long-range (e.g., cellular) communications as well as short- to medium-range (e.g., non-cellular) communications. Cellular-capable V2X communications may be called Cellular V2X (C-V2X) communications. C-V2X systems may use various cellular radio access technologies (RATs), such as 4G LTE or 5G NR RATs. Certain LTE standards usable in V2X systems may be called LTE-Vehicle (LTE-V) standards.

As shown, the example V2X system includes a number of user devices. As used herein, in the context of V2X systems, and as defined above, the term "user devices" may refer generally to devices that are associated with mobile actors or traffic participants in the V2X system, e.g., mobile (able-to-move) communication devices such as vehicles and pedestrian user equipment (PUE) devices. User devices in the example V2X system include the PUEs 103A and 103B and the vehicles 105A and 105B. Note that in various embodiments, the PUEs 103A and 103B and/or the vehicles 105A and 105B may each be a UE 106, e.g., as further described herein.

The vehicles 105 may constitute various types of vehicles. For example, the vehicle 105A may be a road vehicle or automobile, a mass transit vehicle, or another type of vehicle. The vehicles 105 may conduct wireless communications by various means. For example, the vehicle 105A may include communications equipment as part of the vehicle or housed in the vehicle, or may communicate through a wireless communications device currently contained within or otherwise carried along by the vehicle, such as a user equipment (UE) device (e.g., a smartphone or similar device) carried or worn by a driver, passenger, or other person on board the vehicle, among other possibilities. For simplicity, the term "vehicle" as used herein may include the wireless communications equipment which represents the vehicle and conducts its communications. Thus, for example, when the vehicle 105A is said to conduct wireless communications, it is understood that, more specifically, certain wireless communications equipment associated with and carried along by the vehicle 105A is performing the wireless communications.

The pedestrian UEs (PUEs) 103 may constitute various types of user equipment (UE) devices, e.g., portable devices capable of wireless communication, such as smartphones, smartwatches, and so forth, and may be associated with various types of users. Thus, the PUEs 103 are UEs, e.g., such as UE 106, and may be referred to as UEs and/or UE devices. Note that although referred to as PUEs (pedestrian UEs), the PUEs 103 may not necessarily be carried by persons who are actively walking near roads or streets. PUEs may refer to UEs participating in a V2X system that are carried by stationary persons, by persons walking or running, or by persons on vehicles that may not substantially bolster the devices' power capabilities, such as bicycles, scooters, or certain motor vehicles. Note also that not all UEs participating in a V2X system are necessarily PUEs.

The user devices may be capable of communicating using multiple wireless communication standards. For example, the PUE 103A may be configured to communicate using a wireless networking (e.g., Wi-Fi) and/or peer-to-peer wireless communication protocol (e.g., Bluetooth, Wi-Fi peer-to-peer, and so forth) in addition to at least one cellular communication protocol (e.g., GSM, UMTS, LTE, LTE-A, LTE-V, HSPA, 3GPP2 CDMA2000, 5G NR, and so forth). The PUE 103A may also and/or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, as desired. Other combinations of wireless communication standards (including more than two wireless communication standards) are also possible.

As shown, certain user devices may be able to conduct communications with one another directly, e.g., without an intermediary infrastructure device such as base station 102A or RSU 110A. As shown, vehicle 105A may conduct V2X-related communications directly with vehicle 105B. Similarly, the vehicle 105B may conduct V2X-related communications directly with PUE 103B. Such peer-to-peer communications may utilize a "sidelink" interface such as the PC5 interface in the case of some LTE and/or 5G NR embodiments. In some embodiments, the PC5 interface supports direct cellular communication between user devices (e.g., between vehicles 105), while the Uu interface supports cellular communications with infrastructure devices such as base stations. The PC5/Uu interfaces are used only as an example, and PC5 as used herein may represent various other possible wireless communications technologies that allow for direct sidelink communications between user devices, while Uu in turn may represent cellular communications conducted between user devices and infrastructure devices, such as base stations. Some user devices in a V2X system, e.g., PUE 103A, may be unable to perform sidelink communications, e.g., because they lack certain hardware necessary to perform such communications.

As shown, the example V2X system includes a number of infrastructure devices in addition to the above-mentioned user devices. As used herein, "infrastructure devices" in the context of V2X systems refers to certain devices in a V2X system which are not user devices and are not carried by traffic actors (e.g., pedestrians, vehicles, or other mobile users), but rather which facilitate user devices' participation in the V2X network. The infrastructure devices in the example V2X system include base station 102A and roadside unit (RSU) 110A.

The base station (BS) 102A may be a base transceiver station (BTS) or cell site (a "cellular base station"), and may include hardware that enables wireless communication with user devices, e.g., with the user devices 103A and 105A.

The communication area (or coverage area) of the base station may be referred to as a "cell" or "coverage". The base station 102A and user devices such as PUE 103A may be configured to communicate over the transmission medium using any of various radio access technologies (RATs), also referred to as wireless communication technologies, or telecommunication standards, such as GSM, UMTS, LTE, LTE-Advanced (LTE-A), LTE-Vehicle (LTE-V), HSPA, 3GPP2 CDMA2000, 5G NR, and so forth. Note that if the base station 102A is implemented in the context of LTE, it may alternately be referred to as an 'eNodeB', or eNB whereas if the base station 102A is implemented in the context of 5G NR, it may alternately be referred to as a 'gNodeB', or gNB.

As shown, the base station 102A may also be equipped to communicate with a network 100 (e.g., the V2X network, as well as a core network of a cellular service provider, a telecommunication network such as a public switched telephone network (PSTN), and/or the Internet, among various possibilities). Thus, the base station 102A may facilitate communication between user devices and/or between user devices and the network 100. The base station 102A may provide user devices, such as PUE 103A, with various telecommunication capabilities, such as voice, SMS and/or data services. In particular, the base station 102A may provide connected user devices, such as PUE 103A and vehicle 105A, with access to the V2X network.

Thus, while the base station 102A may act as a "serving cell" for user devices 103A and 105A as illustrated in FIG. 1, the user devices 103B and 105B may also be capable of communicating with the base station 102A. The user devices shown, e.g., user devices 103A, 103B, 105A, and 105B may also be capable of receiving signals from (and may possibly be within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are of course also possible.

Roadside unit (RSU) 110A constitutes another infrastructure device usable for providing certain user devices with access to the V2X network. RSU 110A may be one of various types of devices, such as a base station, e.g., a transceiver station (BTS) or cell site (a "cellular base station"), or another type of device that includes hardware that enables wireless communication with user devices and facilitates their participation in the V2X network.

RSU 110A may be configured to communicate using one or more wireless networking communication protocols (e.g., Wi-Fi), cellular communication protocols (e.g., LTE, LTE-V, 5G NR and so forth), and/or other wireless communication protocols. In some embodiments, RSU 110A may be able to communicate with devices using a "sidelink" technology such as PC5.

RSU 110A may communicate directly with user devices, such as the vehicles 106A and 106B as shown. RSU 110A may also communicate with the base station 102A. In some cases, RSU 110A may provide certain user devices, e.g., vehicle 106B, with access to the base station 102A. While RSU 110A is shown communicating with vehicles 106, it may also (or otherwise) be able to communicate with PUEs 104. Similarly, RSU 110A may not necessarily forward user device communications to the base station 102A. In some embodiments, the RSU 110A and may constitute a base station itself, and/or may forward communications to the server 120.

The server 120 constitutes a network entity of the V2X system, as shown, and may be referred to as a cloud server. Base station 102A and/or RSU 110A may relay certain V2X-related communications between the user devices 104 and 106 and the server 120. The server 120 may be used to process certain information collected from multiple user devices, and may administer V2X communications to the user devices in order to coordinate traffic activity. In various other embodiments of V2X systems, various functions of the cloud server 120 may be performed by an infrastructure device such as the base station 102A or RSU 110A, performed by one or more user devices, and/or not performed at all.

Figure 2:
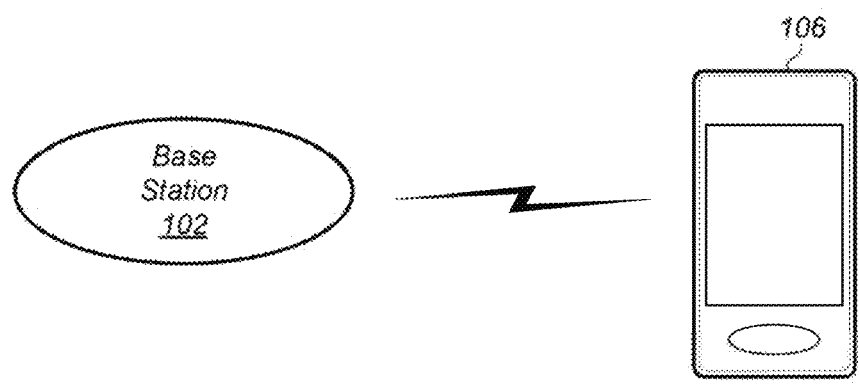
FIG. 2 illustrates a base station in communication with a user equipment (UE) device, according to some embodiments.

FIG. 2—Communication Between a UE and Base Station

FIG. 2 illustrates a user equipment (UE) device 106 (e.g., one of the PUEs 103A or 103B and/or vehicles 105A or 105B in FIG. 1) in communication with a base station 102 (e.g., the base station 102A in FIG. 1), according to some embodiments. The UE 106 may be a device with cellular communication capability such as a mobile phone, a handheld device, a computer or a tablet, or virtually any type of portable wireless device.

The UE 106 may include a processor that is configured to execute program instructions stored in memory. The UE 106 may perform any of the method embodiments described herein by executing such stored instructions. Alternatively, and/or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 104 may be configured to communicate using, for example, CDMA2000 (1×RTT/1×EV-DO/HRPD/eHRPD) LTE, and/or 5G NR using a single shared radio and/or 5G NR or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using any of 5G NR, LTE, and/or 1×RTT (or LTE or GSM), and separate radios for communicating using each of Wi-Fi and Bluetooth. Other configurations are also possible.

Figure 3:
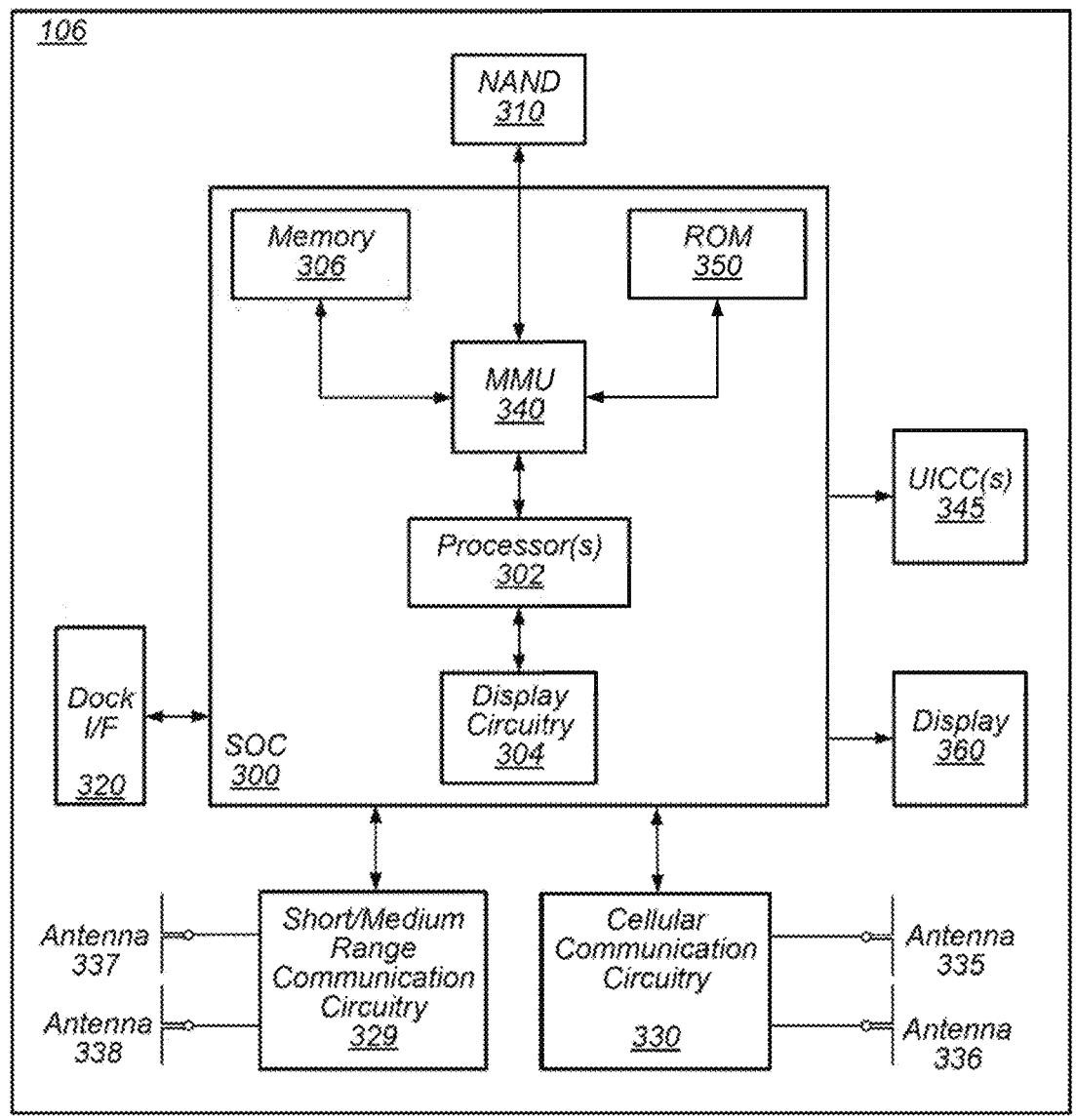
FIG. 3 illustrates an example block diagram of a UE according to some embodiments.

FIG. 3: Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device (e.g., such as PUEs 103 and/or vehicles 105), a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; and so forth), the display 360, which may be integrated with or external to the communication device 106, and cellular communication circuitry 330 such as for 5G NR, LTE, GSM, and so forth, and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345. Note that the term "SIM" or "SIM entity" is intended to include any of various types of SIM implementations or SIM functionality, such as the one or more UICC(s) cards 345, one or more eUICCs, one or more eSIMs, either removable or embedded, and so forth. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM 310 may be implemented as a removable smart card. Thus the SIM(s) may be one or more removable smart cards (such as UICC cards, which are sometimes referred to as "SIM cards"), and/or the SIMS 310 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMs may include components such as a processor and/or a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may comprise two embedded SIMs, two removable SIMs, or a combination of one embedded SIMs and one removable SIMs. Various other SIM configurations are also contemplated.

As noted above, in some embodiments, the UE 106 may include two or more SIMs. The inclusion of two or more SIMs in the UE 106 may allow the UE 106 to support two different telephone numbers and may allow the UE 106 to communicate on corresponding two or more respective networks. For example, a first SIM may support a first RAT such as LTE, and a second SIM 310 support a second RAT such as 5G NR. Other implementations and RATs are of course possible. In some embodiments, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VOLTE) technology and/or voice over NR (VoNR) technology. In some embodiments, the UE 106 may support Dual SIM Dual Standby (DSDS) functionality. The DSDS functionality may allow either of the two SIMs in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short to medium range wireless communication circuitry 329, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods for triggering and signaling of an inter-UE coordination message, e.g., for V2X Mode 2 resource allocation, as further described herein.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, and so forth) configured to perform the functions of processor(s) 302.

Further, as described herein, cellular communication circuitry 330 and short to medium range wireless communication circuitry 329 may each include one or more processing elements. In other words, one or more processing elements may be included in cellular communication circuitry 330 and, similarly, one or more processing elements may be included in short to medium range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, and so forth) configured to perform the functions of cellular communication circuitry 330. Similarly, the short to medium range wireless communication circuitry 329 may include one or more ICs that are configured to perform the functions of short to medium range wireless communication circuitry 329. In addition, each integrated circuit may include circuitry (e.g., first circuitry, second circuitry, and so forth) configured to perform the functions of short to medium range wireless communication circuitry 329.

Figure 4:
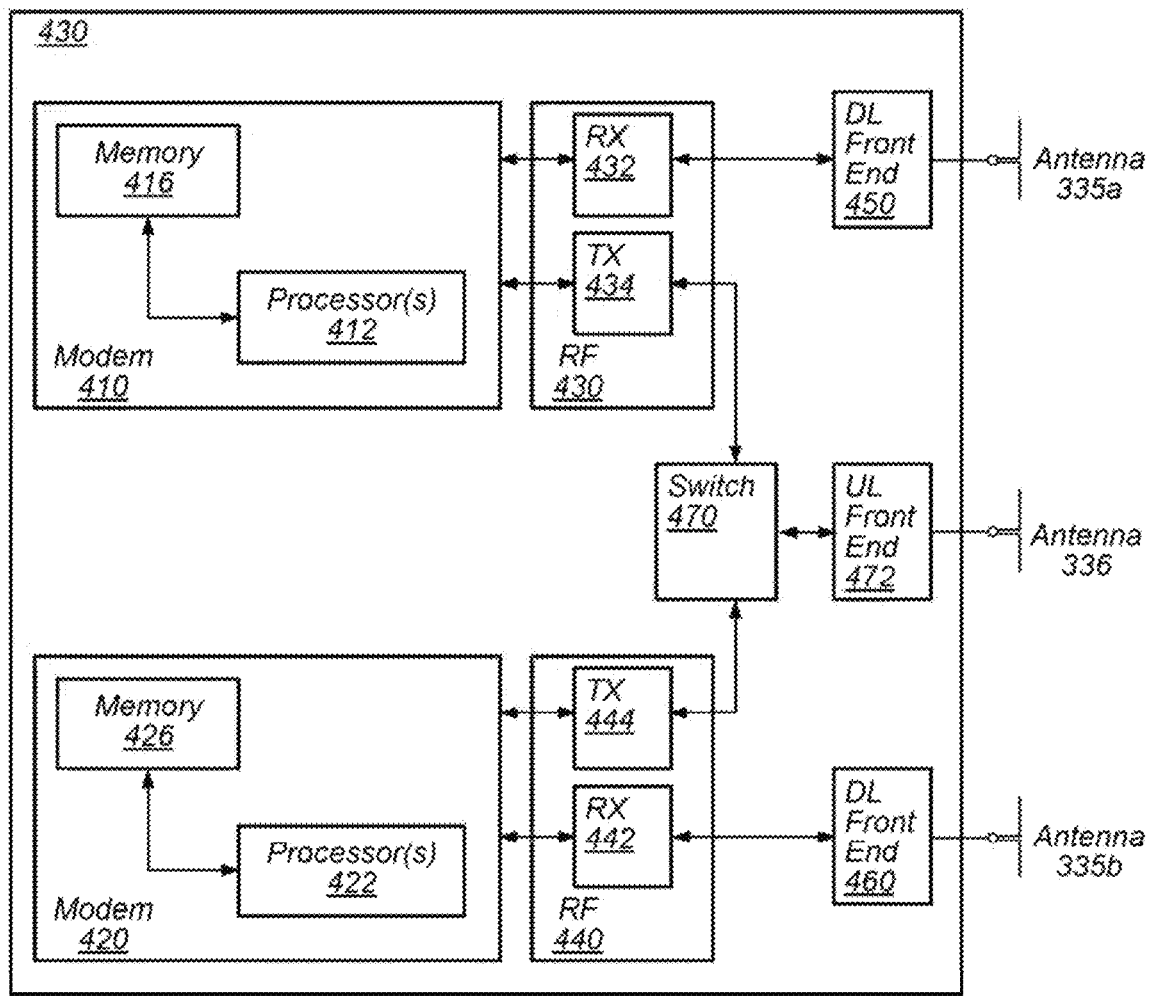
FIG. 4 illustrates an example block diagram of cellular communication circuitry, according to some embodiments.

FIG. 4: Block Diagram of Cellular Communication Circuitry

FIG. 4 illustrates an example simplified block diagram of cellular communication circuitry, according to some embodiments. It is noted that the block diagram of the cellular communication circuitry of FIG. 4 is only one example of a possible cellular communication circuit. According to embodiments, cellular communication circuitry 430, which may be cellular communication circuitry 430, may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 430 may couple (e.g., communicatively; directly or indirectly) to one or more antennas, such as antennas 435a-b and 436 as shown (in FIG. 4). In some embodiments, cellular communication circuitry 430 may include dedicated receive chains (including and/or coupled to, e.g., communicatively; directly or indirectly. dedicated processors and/or radios) for multiple RATs (e.g., a first receive chain for LTE and a second receive chain for 4G NR). For example, as shown in FIG. 4, cellular communication circuitry 430 may include a modem 410 and a modem 420. Modem 410 may be configured for communications according to a first RAT, e.g., such as LTE or LTE-A, and modem 420 may be configured for communications according to a second RAT, e.g., such as 4G NR.

As shown, modem 410 may include one or more processors 412 and a memory 416 in communication with processors 412. Modem 410 may be in communication with a radio frequency (RF) front end 430. RF front end 430 may include circuitry for transmitting and receiving radio signals. For example, RF front end 430 may include receive circuitry (RX) 432 and transmit circuitry (TX) 434. In some embodiments, receive circuitry 432 may be in communication with downlink (DL) front end 450, which may include circuitry for receiving radio signals via antenna 335a.

Similarly, modem 420 may include one or more processors 422 and a memory 426 in communication with processors 422. Modem 420 may be in communication with an RF front end 440. RF front end 440 may include circuitry for transmitting and receiving radio signals. For example, RF front end 440 may include receive circuitry 442 and transmit circuitry 444. In some embodiments, receive circuitry 442 may be in communication with DL front end 460, which may include circuitry for receiving radio signals via antenna 335b.

In some embodiments, a switch 470 may couple transmit circuitry 434 to uplink (UL) front end 472. In addition, switch 470 may couple transmit circuitry 444 to UL front end 472. UL front end 472 may include circuitry for transmitting radio signals via antenna 336. Thus, when cellular communication circuitry 430 receives instructions to transmit according to the first RAT (e.g., as supported via modem 410), switch 470 may be switched to a first state that allows modem 410 to transmit signals according to the first RAT (e.g., via a transmit chain that includes transmit circuitry 434 and UL front end 472). Similarly, when cellular communication circuitry 430 receives instructions to transmit according to the second RAT (e.g., as supported via modem 420), switch 470 may be switched to a second state that allows modem 420 to transmit signals according to the second RAT (e.g., via a transmit chain that includes transmit circuitry 444 and UL front end 472).

In some embodiments, the cellular communication circuitry 430 may be configured to perform methods triggering and signaling of an inter-UE coordination message, e.g., for V2X Mode 2 resource allocation, as further described herein.

As described herein, the modem 410 may include hardware and software components for implementing the above features or for time division multiplexing UL data for NSA NR operations, as well as the various other techniques described herein. The processors 412 may be configured to implement part or all of the features described herein, e.g., by executing program instructions stored on a memory medium (e.g., a non-transitory computer-readable memory medium). Alternatively (or in addition), processor 412 may be configured as a programmable hardware element, such as an FPGA (Field Programmable Gate Array), or as an ASIC (Application Specific Integrated Circuit). Alternatively (or in addition) the processor 412, in conjunction with one or more of the other components 430, 432, 434, 450, 470, 472, 335 and 336 may be configured to implement part or all of the features described herein.

In addition, as described herein, processors 412 may include one or more processing elements. Thus, processors 412 may include one or more integrated circuits (ICs) that are configured to perform the functions of processors 412. In addition, each integrated circuit may include circuitry (e.g., first circuitry, second circuitry, and so forth) configured to perform the functions of processors 412.

As described herein, the modem 420 may include hardware and software components for implementing the above features for communicating a scheduling profile for power savings to a network, as well as the various other techniques described herein. The processors 422 may be configured to implement part or all of the features described herein, e.g., by executing program instructions stored on a memory medium (e.g., a non-transitory computer-readable memory medium). Alternatively (or in addition), processor 422 may be configured as a programmable hardware element, such as an FPGA (Field Programmable Gate Array), or as an ASIC (Application Specific Integrated Circuit). Alternatively (or in addition) the processor 422, in conjunction with one or more of the other components 440, 442, 444, 450, 470, 472, 335 and 336 may be configured to implement part or all of the features described herein.

In addition, as described herein, processors 422 may include one or more processing elements. Thus, processors 422 may include one or more integrated circuits (ICs) that are configured to perform the functions of processors 422. In addition, each integrated circuit may include circuitry (e.g., first circuitry, second circuitry, and so forth) configured to perform the functions of processors 422.

Figure 5:
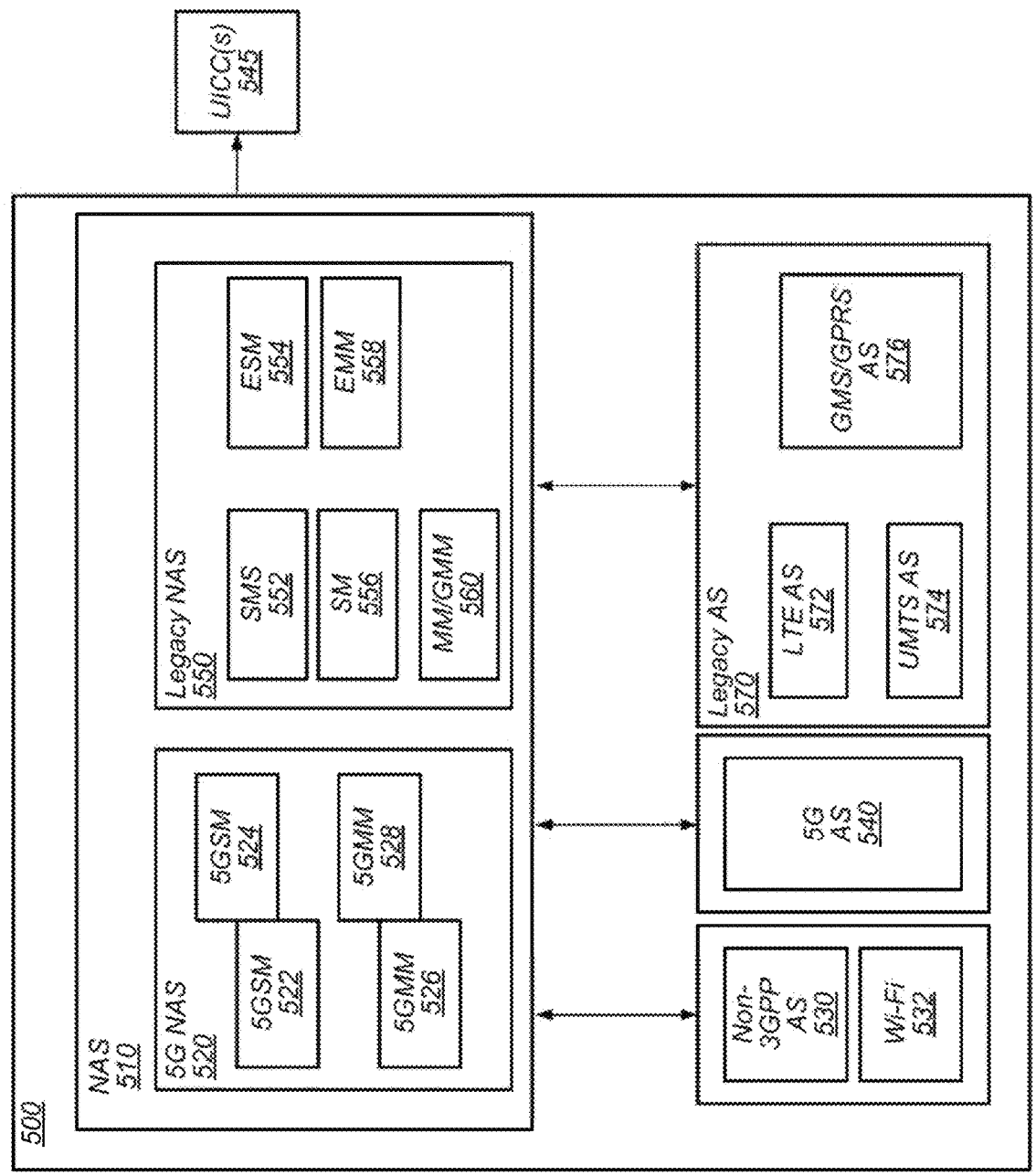
FIG. 5 illustrates an example of a baseband processor architecture for a UE, according to some embodiments.

FIG. 5: Baseband Processor Architecture

FIG. 5 illustrates an example of a baseband processor architecture for a UE (e.g., such as UE 106), according to some embodiments. The baseband processor architecture 500 described in FIG. 5 may be implemented on one or more radios (e.g., radios 429 and/or 430 described above) or modems (e.g., modems 510 and/or 520) as described above. As shown, the non-access stratum (NAS) 510 may include a 5G NAS 520 and a legacy NAS 550. The legacy NAS 550 may include a communication connection with a legacy access stratum (AS) 570. The 5G NAS 520 may include communication connections with both a 5G AS 540 and a non-3GPP AS 530 and Wi-Fi AS 532. The 5G NAS 520 may include functional entities associated with both access stratums. Thus, the 5G NAS 520 may include multiple 5G MM entities 526 and 528 and 5G session management (SM) entities 522 and 524. The legacy NAS 550 may include functional entities such as short message service (SMS) entity 552, evolved packet system (EPS) session management (ESM) entity 554, session management (SM) entity 556, EPS mobility management (EMM) entity 558, and mobility management (MM)/GPRS mobility management (GMM) entity 560. In addition, the legacy AS 570 may include functional entities such as LTE AS 572, UMTS AS 574, and/or GSM/GPRS AS 576.

Thus, the baseband processor architecture 500 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods triggering and signaling of an inter-UE coordination message, e.g., for V2X Mode 2 resource allocation, e.g., as further described herein.

Figure 6:
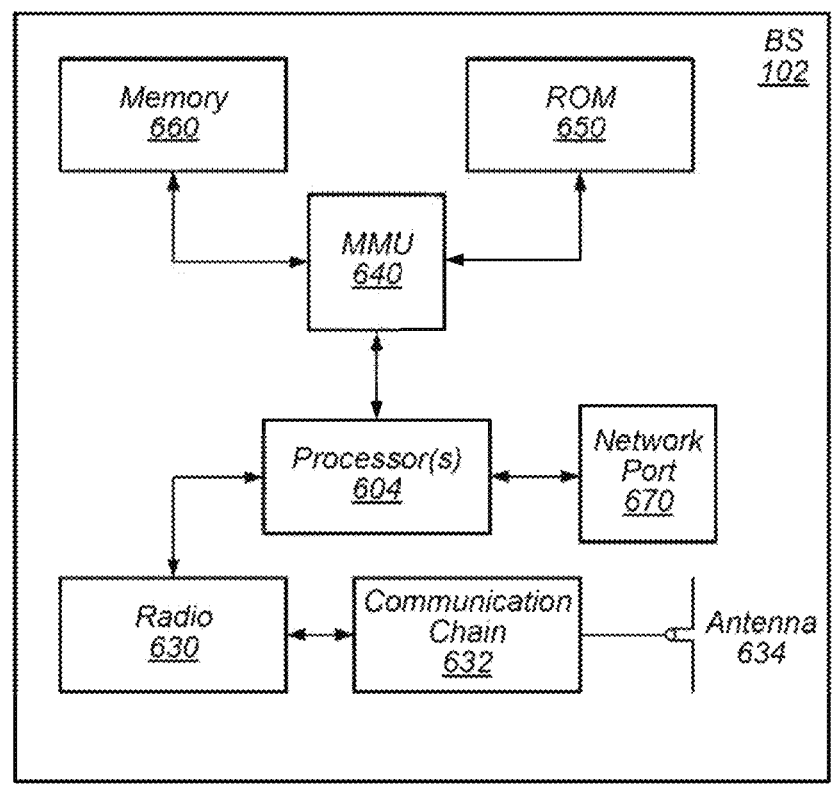
FIG. 6 illustrates an example block diagram of a base station, according to some embodiments.

FIG. 6: Block Diagram of a Base Station

FIG. 6 illustrates an example block diagram of a base station 102 (e.g., base station 102A in FIG. 1), according to some embodiments. It is noted that the base station of FIG. 6 is merely one example of a possible base station. As shown, the base station 102 may include processor(s) 604 which may execute program instructions for the base station 102. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The base station 102 may include at least one network port 670. The network port 670 may be configured to couple to a telephone network and provide a plurality of devices, such as UE devices 106.

The network port 670 (or an additional network port) may also or alternatively be configured to couple to a cellular network, e.g., a core network of a cellular service provider. The core network may provide mobility related services and/or other services to a plurality of devices, such as UE devices 106. In some cases, the network port 670 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 634, and possibly multiple antennas. The at least one antenna 634 may be configured to operate as a wireless transceiver and may be further configured to communicate with UE devices 106 via radio 630. The antenna 634 communicates with the radio 630 via communication chain 632. Communication chain 632 may be a receive chain, a transmit chain or both. The radio 630 may be configured to communicate via various wireless communication standards, including, but not limited to, 5G NR, LTE, LTE-A, GSM, UMTS, CDMA2000, Wi-Fi, and so forth.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another example, the base station 102 may include a 5G NR radio for performing communication according to 5G NR as well as a Wi-Fi radio for performing communication according to Wi-Fi. In such a case, the base station 102 may be capable of operating as both 5G NR base station and a Wi-Fi access point. As a further possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, and so forth).

As described further subsequently herein, the BS 102 may include hardware and software components for implementing or supporting implementation of features described herein. The processor 604 of the base station 102 may be configured to implement or support implementation of part or all of the methods described herein, e.g., by executing program instructions stored on a memory medium (e.g., a non-transitory computer-readable memory medium). Alternatively, the processor 604 may be configured as a programmable hardware element, such as an FPGA (Field Programmable Gate Array), or as an ASIC (Application Specific Integrated Circuit), or a combination thereof. Alternatively (or in addition) the processor 604 of the BS 102, in conjunction with one or more of the other components 630, 632, 634, 640, 650, 660, 670 may be configured to implement or support implementation of part or all of the features described herein.

In addition, as described herein, processor(s) 604 may be comprised of one or more processing elements. In other words, one or more processing elements may be included in processor(s) 604. Thus, processor(s) 604 may include one or more integrated circuits (ICs) that are configured to perform the functions of processor(s) 604. In addition, each integrated circuit may include circuitry (e.g., first circuitry, second circuitry, and so forth) configured to perform the functions of processor(s) 604.

Further, as described herein, radio 630 may be comprised of one or more processing elements. In other words, one or more processing elements may be included in radio 630. Thus, radio 630 may include one or more integrated circuits (ICs) that are configured to perform the functions of radio 630. In addition, each integrated circuit may include circuitry (e.g., first circuitry, second circuitry, and so forth) configured to perform the functions of radio 630.

Sidelink Resource Management

In some existing implementations, a listen before talk (LBT) mechanism may be used to access shared medium (e.g., such as unlicensed bands commonly used for Wi-Fi, Bluetooth, and other short to medium range communications, e.g., non-3GGP access) to avoid collisions (e.g., of transmissions emanating from two or more wireless devices attempting to access the shared medium) and to improve medium utilization efficiency. However, LBT mechanisms are not collision free. In other words, LBT mechanisms cannot guarantee collision free transmissions.

For example, in the case of a unicast transmission, a transmitter may readily detect a transmission collision based on a receiver's acknowledgement/negative acknowledgement (ACK/NACK) feedback. However, in the case of a multicast (or group-cast) transmission, a transmitter may not easily detect a collision based on receivers' ACK/NACKs due, at least in part, to heavy traffic associated with ACK/NACKs from multiple receivers and to a transmitter's inability to distinguish between (or isolate) transmission collisions from channel quality issues based on received ACK/NACKs. In other words, since receivers in a multicast transmission may have different locations with differing channel quality, a reason for a NACK (e.g., transmission collision versus poor channel quality) cannot be determined by the transmitter. Additionally, in the case of a broadcast transmission, feedback from receivers is known to not be feasible, so in this scenario, a transmitter would not have knowledge of collisions. Further, in some implementations, a transmitter may reserve periodic slots within a reservation period for communication. In such implementations, if collisions occur, the collisions could persist for at least a portion of the reservation period (and in a worst-case scenario, the duration of the reservation period) if the transmitter does not detect (or is unable to detect) the collisions.

Figure 7:
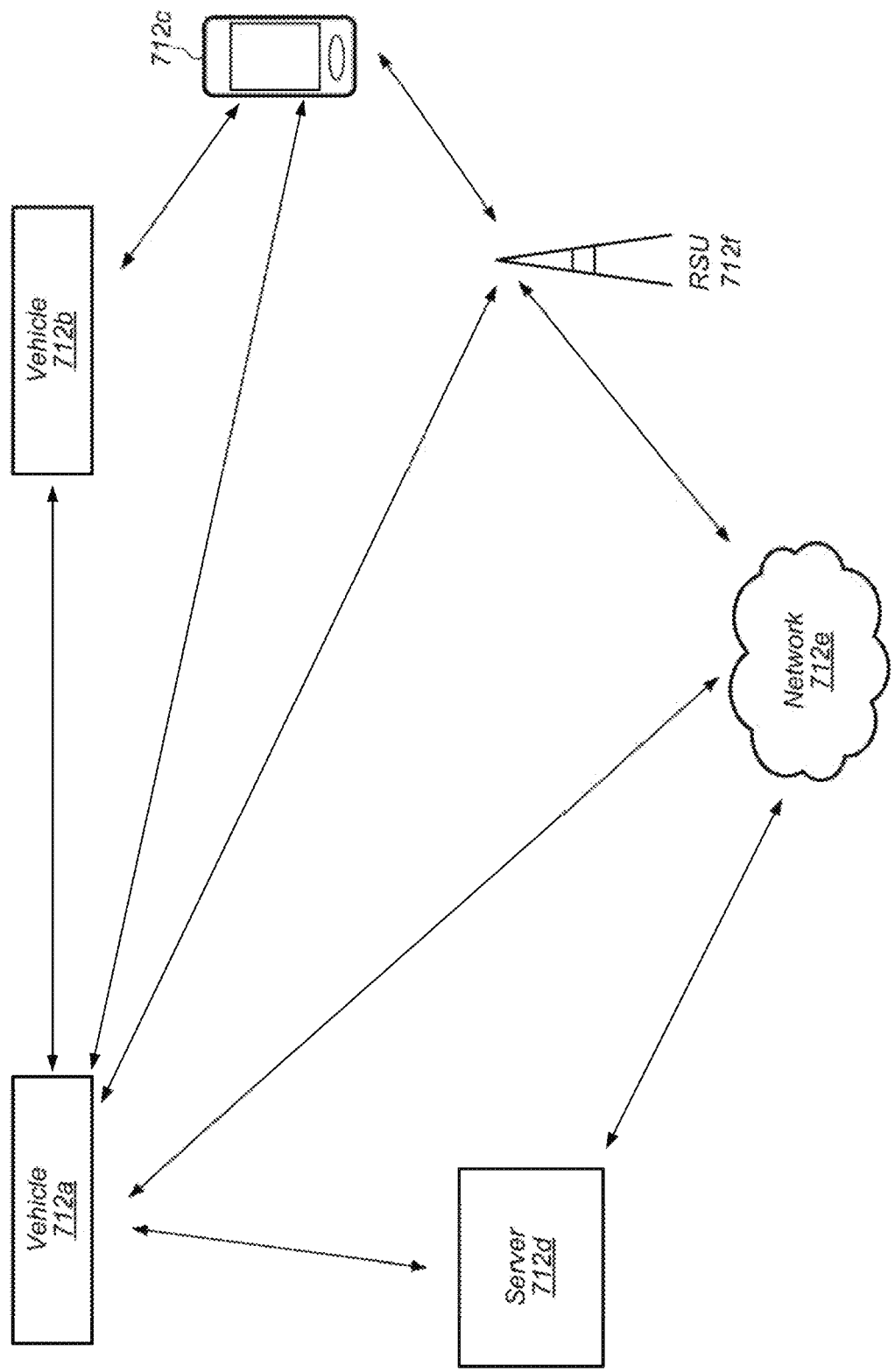
FIG. 7 illustrates an example of a vehicle-to-everything network.

As an example, vehicle-to-everything (V2X) communications, e.g., as specified by 3GPP TS 22.185 V.14.3.0 and beyond, allows for communication between a vehicle (e.g., a mobile unit within a vehicle, such as a wireless device comprised within or currently contained within a vehicle and/or another transmitter contained or comprised with a vehicle) and various wireless devices. For example, as illustrated by FIG. 7, a vehicle, such as vehicle 712a, may communicate with various devices (e.g., devices 712b-f), such as road side units (RSUs), infrastructure (V2I), network (V2N), pedestrian (V2P), and/or other vehicles (V2V). In addition, as shown, all devices within the V2X framework may communicate with other devices. V2X communications may utilize both long range (e.g., cellular) communications as well as short to medium range communications (e.g., non-cellular). In some contemplated implementations, the non-cellular communications may use unlicensed bands as well as a dedicated spectrum at 5.9 GHZ. Moreover, V2X communications may include unicast, multicast, groupcast, and/or broadcast communications. Each communication type may employ an LBT mechanism. Further, under the V2X communication protocol, a transmitter may reserve periodic slots within a reservation period. Thus, as described above, in various cases a transmitter utilizing V2X communications, may, in some instances, be unable to detect collisions after using an LBT mechanism.

In some existing implementations, 5G NR V2X may include various scheduling modes. For example, 5G NR V2X mode 2 may be designed for UE self-determination of sidelink transmission resources. 5G NR V2X mode 2 includes various sub-modes, including:

Mode 2(a) in which a user equipment device (UE) autonomously selects sidelink resources for transmission;

Mode 2(b) in which a UE assists sidelink resource selection for other UE(s);

Mode 2(c) in which a UE is configured with NR configured grants (e.g., network defined semi-persistent grants) for sidelink transmission; and Mode 2(d) in which a UE schedules sidelink transmissions of other UEs.

In addition, due to the periodic nature of V2X messaging, existing implementations of V2X may support semi-persistent scheduling (SPS), e.g., configured grant(s). For example, semi-persistent resources in SPS may represent timely repeated resources across a set of discontinuous sub-frames with a certain repetition periodicity. Further, existing implementations of SPS (e.g., LTE V2X) and its corresponding resource allocation design are optimized for broadcast service. However, 5G NR V2X mode 2 additionally supports both unicast and groupcast services. Thus, there is a strong need to enhance methods that aid semi-persistent resource allocation for unicast service and groupcast service in 5G NR V2X mode 2.

Triggering and Signaling of an Inter-UE Coordination Message

In current cellular communication systems, e.g., such as defined by NR V2X Release 16, for a Mode 2 resource allocation scheme, a transmitting wireless device may select sidelink transmission resources based on its own sensing and resource selection procedure, e.g., without input from the receiving wireless device. NR V2X Release 17 introduced that, for inter-UE coordination of Mode 2 resource allocations, a set of resources may be determined by a first wireless device (e.g., UE-A) and sent to a second wireless device (UE-B). The second wireless device may then take the set of resources into account in a resource selection for its own transmission. However, it was not defined whether the set of resources included a resource set which is preferred for the second wireless device's transmissions or include a resource set which is preferred not to be used for the second wireless device's transmissions. Additionally, left undefined were conditions for sending the set of resources, how to indicate the set of resources, and how the first wireless device selects the set of resources.

Embodiments described herein provide systems, methods, and mechanisms for triggering and signaling of an inter-UE coordination message, e.g., for V2X Mode 2 resource allocation. In some embodiments, a first UE, such as UE 106, may receive a trigger signal from a second UE to provide an inter-UE coordination message, where the inter-UE coordination message indicates a set of resources for the second UE. In some embodiments, a first UE, such as UE 106, may detect a trigger condition to provide an inter-UE coordination message to a second UE, where the inter-UE coordination message indicates a set of resources for the second UE. In some embodiments, the inter-UE coordination message may include a resource map. In some embodiments, the inter-UE coordination message may include one or more preferred resources. In some embodiments, the inter-UE coordination message may include one or more non-preferred resources. In some embodiments, the inter-UE coordination message may be broadcast/groupcast/unicast periodically.

In some embodiments, the first UE may determine and/or select resources for the inter-UE coordination message. For example, the first UE may determine a resource selection window for transmitting the inter-UE coordination message to the second UE. In some embodiments, a packet delay budget (PDB) may depend on a collision time and/or half-duplex restriction time. For example, if a resource collision slot and/or half-duplex restriction slot is detected, the first UE may notify the second UE prior to the slot with an allowance for the second UE's processing time (e.g., for reception of the inter-UE coordination message and/or for resource re-selection). In addition, the first UE may determine a data priority of the inter-UE coordination message (e.g., to be used in the first UE's resource selection procedure for the inter-UE coordination message). For example, if a sidelink coordination request message includes a data priority level, then the included data priority level can be used for the inter-UE coordination message. In some embodiments, the data priority level may be pre-configured per resource pool and/or configured on PC5-RRC between the first UE and the second UE.

Figure 8:
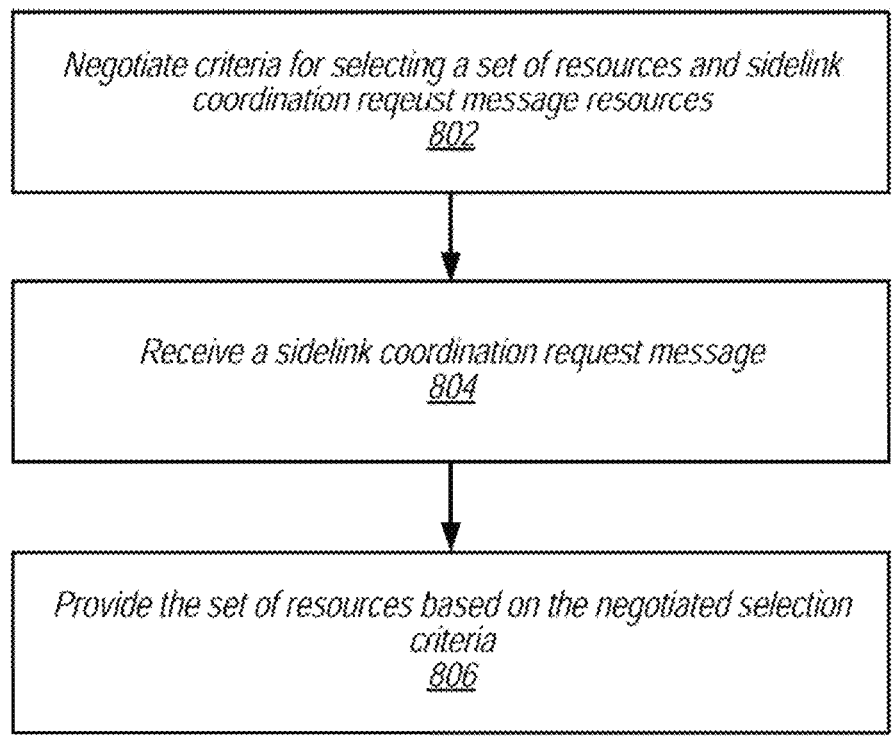
FIGS. 8 and 9 illustrate examples of methods for a second UE to trigger transmission of an inter-UE coordination message by a first UE, according to some embodiments.
Figure 9:
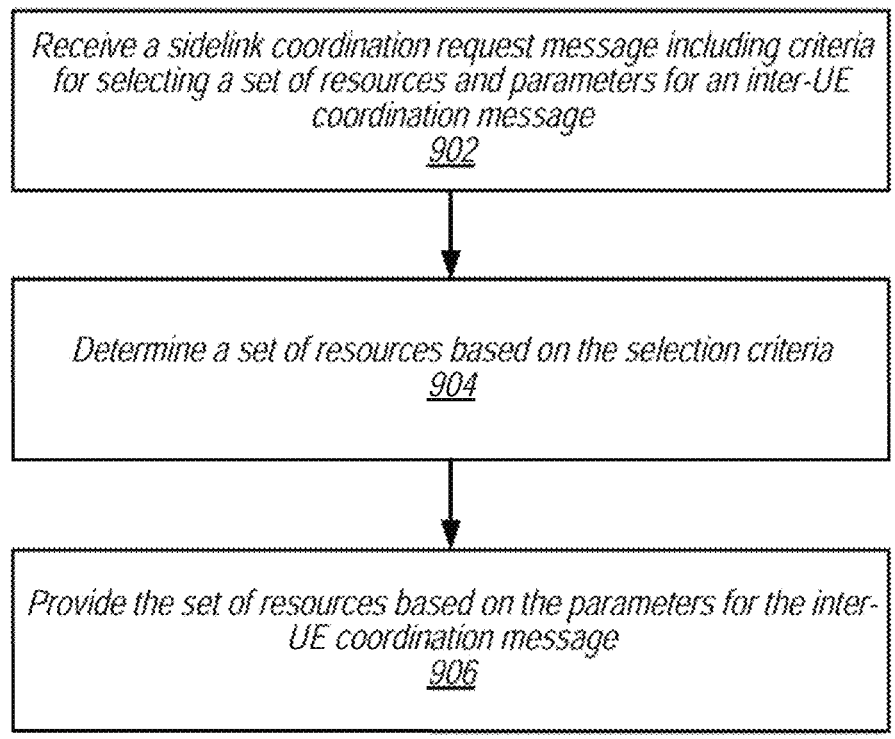
Figure 10:
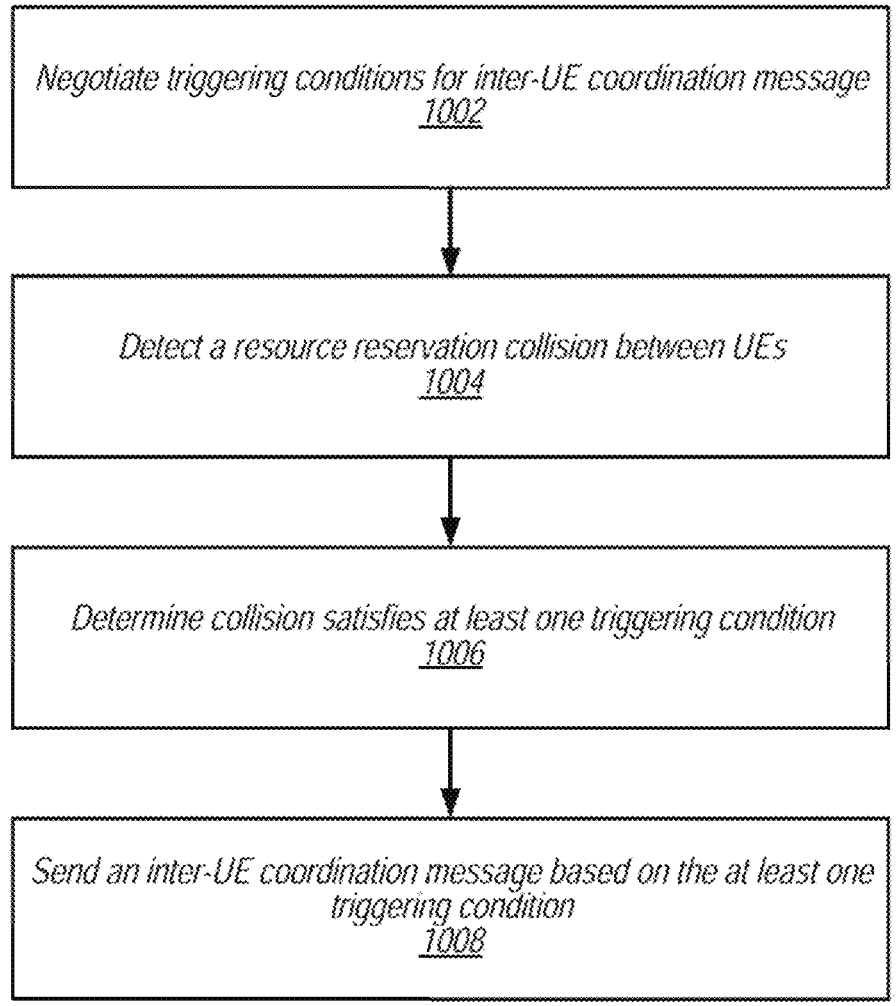
FIGS. 10 and 11 illustrate examples of methods for a first UE to trigger transmission of the inter-UE coordination message to a second UE, according to some embodiments.
Figure 11:
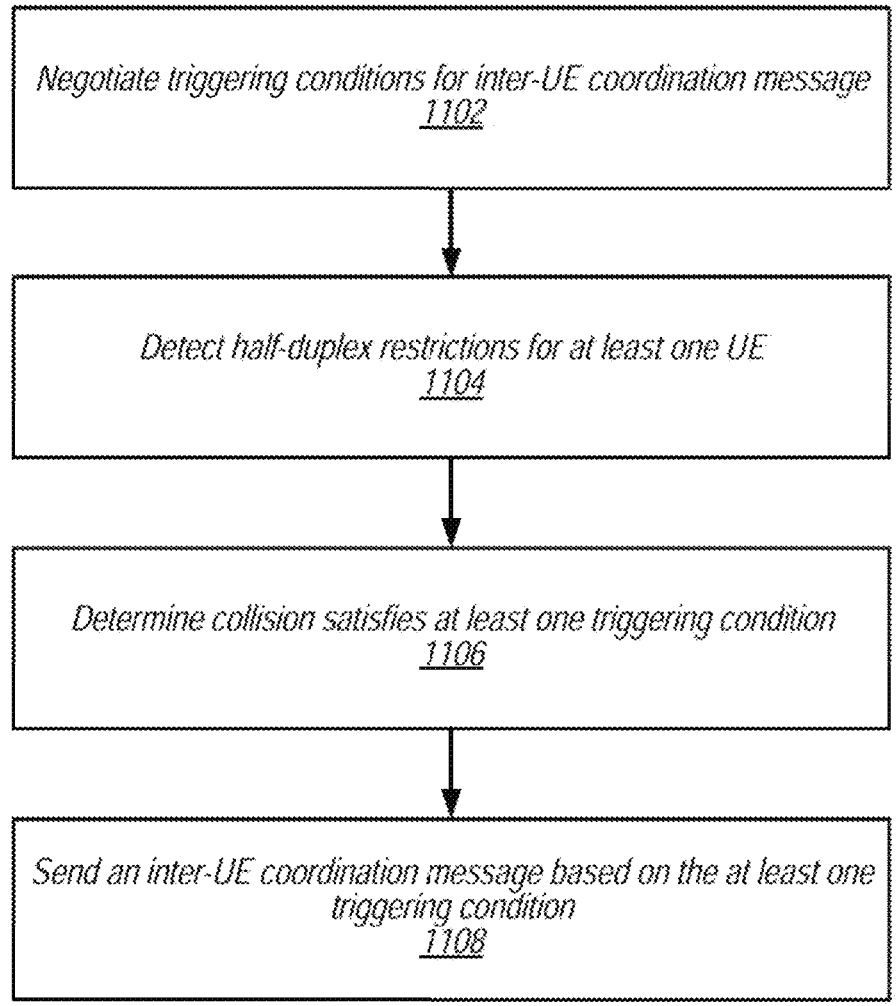

For example, FIGS. 8, 9, 10, and 11 illustrate block diagrams of various examples of methods for triggering transmission of an inter-UE coordination message, according to some embodiments. In the embodiments described herein, the inter-UE coordination message may be transmitted from a first UE to a second UE, where the first UE determines a set of resources to indicate via the inter-UE coordination message, and where the set of resources are used by the second UE for sidelink transmissions. FIGS. 8 and 9 illustrate examples of methods for the second UE to trigger transmission of the inter-UE coordination message, e.g., via transmission of a sidelink coordination request message to the first UE. FIGS. 10 and 11 illustrate examples of methods for the first UE to trigger transmission of the inter-UE coordination message, e.g., via detection of one or more triggering conditions. Note that the methods shown in FIGS. 8, 9, 10, and 11 may be used in conjunction with one another as well as with any of the systems, methods, or devices shown in the Figures, among other devices.

Turning to FIG. 8, illustrated is a block diagram of an example of a method for a second UE to trigger transmission of an inter-UE coordination message from a first UE, according to some embodiments. As noted, the method shown in FIG. 8 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 802, criteria for selecting a set of resources for sidelink communications as well as resources for a sidelink coordination request message may be negotiated between a first UE and a second UE, where each UE may be a UE 106 as described herein. For example, criteria for selecting the set of resources may be based, at least in part, on pre-configuration of a resource pool and/or on configuration of PC5-RRC.

In some embodiments, a sidelink coordination request message may include a single bit that indicates a request, by the second UE, for the first UE to provide a set of preferred and/or non-preferred resources for the second UE's sidelink transmissions. Additionally, the sidelink coordination request message may be signaled as a sequence-based transmission, e.g., similar to a physical sidelink feedback channel (PSFCH) transmission. Resources for the sidelink coordination request message may include the last few (e.g., the last three or fewer) symbols of a time slot. For example, the sidelink coordination request message may be frequency division multiplexed with PSFCH resources at the end of a time slot. Further, time-frequency-code resources of the sidelink coordination request message may be associated with an identifier (ID) of the first UE and an ID of the second UE. In some embodiments, the second UE may determine resources for the sidelink coordination request message based, at least in part, on the ID of the first UE and the ID of the second UE. Similarly, the first UE may receive the sidelink coordination request message based on the ID of the first UE and the ID of the second UE.

At 804, the first UE may receive a sidelink coordination request message from the second UE. The sidelink coordination request message may be a triggering signal for the first UE to provide the second UE with an inter-UE coordination message. The inter-UE coordination message may indicate a set of resources for the second UE to use for sidelink communications.

At 806, the first UE may provide (e.g., send and/or transmit), to the second UE, an indication of a set of resources for sidelink communications, e.g., via an inter-UE coordination message. The set of resources may be based on the negotiated selection criteria. Additionally, the set of resources may be provided in response to receipt of the sidelink coordination message. Further, the set of resources may be for sidelink communications between the first UE and the second UE.

Turning to FIG. 9, illustrated is a block diagram of another example of a method for a second UE to trigger transmission of an inter-UE coordination message from a first UE, according to some embodiments. As noted, the method shown in FIG. 9 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 902, a first UE may receive, from a second UE, a sidelink coordination request message, where each UE may be a UE 106 as described herein. The sidelink coordination request message may be more than 1 bit and may include criteria for selecting a set of resources for sidelink communications as well as parameters for an inter-UE coordination message. In some embodiments, the set of resources may be a set of preferred and/or non-preferred resources.

In some embodiments, parameters and/or requirements for the set of resources may include any, any combination of, and/or all of a time window for an inter-UE coordination message, a time window for the set of resources, a data priority associated with the set of resources, a number of sub-channels of the set of resources, a periodicity of the set of resources, a cast type and/or destination UE ID of the set of resources, and/or an indication of a format of an inter-UE coordination message (e.g., a resource map, an indication of preferred resources, and/or an indication of non-preferred resources as well as latency requirement associated with the inter-UE coordination message).

In some embodiments, the sidelink coordination request message may be transmitted via higher layer signaling in a physical sidelink shared channel (PSSCH). Alternatively, and/or in addition, the sidelink coordination request message may be transmitted via sidelink control information (SCI), e.g., via an SCI stage 2 format.

In some embodiments, the sidelink coordination request message may include a list of pre-candidate resources for the first UE to recommend. For example, the sidelink coordination request message may include a set of resources based on resources selected by the second UE and/or a set of resources larger than actual resources to be used by the second UE's sidelink transmissions.

At 904, the first UE may determine a set of resources for the second UE to use for sidelink communications based on the selection criteria included in the sidelink coordination request message. In some embodiments, e.g., when the sidelink coordination request message includes a list of pre-candidate resources, the first UE may determine a subset of resources, e.g., based on its own sensing, and notify the second UE of the subset of resources in the inter-UE coordination message.

At 906, the first UE may provide (e.g., send and/or transmit), to the second UE, an indication of a set of resources for sidelink communications, e.g., via an inter-UE coordination message. The set of resources may be based on the parameters included in the sidelink coordination request message. Further, the set of resources may be for sidelink communications between the first UE and the second UE and/or for sidelink communications between the second UE and a third UE.

Turning to FIG. 10, illustrated is a block diagram of an example of a method for a first UE to trigger transmission of an inter-UE coordination message to a second UE, according to some embodiments. As noted, the method shown in FIG. 10 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1002, triggering conditions for transmitting an inter-UE coordination message may be negotiated between a first UE and a second UE, where each UE may be a UE 106 as described herein. Note that selection of triggering conditions may include determining whether the first UE will monitor and detect a trigger event (e.g., such as a resource collision) and/or whether the second UE will send a triggering signal (e.g., such as a sidelink coordination request message) to the first UE. In some embodiments, the trigger conditions may include both the first UE monitoring and detecting triggering events and the second UE being capable of sending a triggering signal. In some embodiments, resource collisions that may cause a trigger event may include any, any combination of, and/or all of a physical sidelink control channel (PSCCH) resource collision, a physical sidelink shared channel (PSSCH) resource collision, and/or a PSFCH resource collision. The resource reservation collision may be for persistent resource collision and/or for a high interference level from the third UE.

At 1004, the first UE may detect a resource reservation collision between the second UE and a third UE. As noted above, the resource reservation collision may include any, any combination of, and/or all of a physical sidelink control channel (PSCCH) resource collision, a physical sidelink shared channel (PSSCH) resource collision, and/or a PSFCH resource collision. The resource reservation collision may be for persistent resource collision and/or for a high interference level from the third UE. In some embodiments, detection of a resource reservation collision may require that a time gap between the collided resources and detection time be larger than a threshold, e.g., to ensure that the second UE has enough time to respond after receiving the inter-UE coordination message.

At 1006, the first UE may determine that the resource reservation collision satisfies one or more criteria for transmitting an inter-UE coordination message, e.g., as described above. For example, the first UE may determine that a time gap between the collided resources and detection time is larger than a threshold, thereby ensuring that the second UE has enough time to respond after receiving the inter-UE coordination message.

At 1008, the first UE may send an inter-UE coordination message to the second UE. The inter-UE coordination message may include an indication of a set of resources for sidelink communications.

Turning to FIG. 11, illustrated is a block diagram of another example of a method for a first UE to trigger transmission of an inter-UE coordination message to a second UE, according to some embodiments. As noted, the method shown in FIG. 11 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1102, triggering conditions for transmitting an inter-UE coordination message may be negotiated between a first UE and a second UE, where each UE may be a UE 116 as described herein. Note that selection of triggering conditions may include determining whether the first UE will monitor and detect a trigger event (e.g., such as a half-duplex restriction) and/or whether the second UE will send a triggering signal (e.g., such as a sidelink coordination request message) to the first UE. In some embodiments, the trigger conditions may include both the first UE monitoring and detecting triggering events and the second UE being capable of sending a triggering signal. In some embodiments, half-duplex restrictions that may cause a trigger event may include half-duplex restrictions of a destination UE (e.g., a third UE), half-duplex restriction of a source UE (e.g., the second UE), and/or half-duplex restrictions due to PSCCH/PSSCH transmission or reception or due to PSFCH transmission or reception.

At 1104, the first UE may detect a half-duplex restriction for a source UE (e.g., the second UE) and/or for a destination UE (e.g., a third UE). For example, the half-duplex restriction may be on the destination UE, e.g., the third UE in communications with the second UE. In such instances, the first UE may detect that the second UE sends transmissions to the third UE while the third UE is unable to receive, e.g., due to the third UE transmitting in the same slot as the transmissions from the second UE. As another example, the half-duplex restriction may be on the source UE, e.g., the second UE. In such instances, the first UE may detect that a fourth UE sends transmission to the second UE while the second UE is unable to receive, e.g., due to the second UE transmitting in the same slot as the transmissions from the fourth UE. In some embodiments, the first UE may detect that the half-duplex restriction may be due to PSCCH/PSSCH transmission or reception or due to PSFCH transmission or reception. In some embodiments, detection of a half-duplex restriction may require that a time gap between the half-duplexed resources and detection time be larger than a threshold, e.g., to ensure that the second UE has enough time to respond after receiving the inter-UE coordination message.

At 1106, the first UE may determine that the half-duplex restriction satisfies one or more criteria for transmitting an inter-UE coordination message, e.g., as described above. For example, the first UE may determine that a time gap between the half-duplexed resources and detection time is larger than a threshold, thereby ensuring that the second UE has enough time to respond after receiving the inter-UE coordination message.

At 1108, the first UE may send an inter-UE coordination message to the second UE. The inter-UE coordination message may include an indication of a set of resources for sidelink communications.

In some embodiments, an inter-UE coordination message may include a resource map indicating a set of resources for a receiving UE (e.g., such as a UE 106) to use for sidelink communications. For example, a coordinating UE, e.g., a first UE (such as a UE 106), may detect available and unavailable resources within a resource selection window. The first UE may generate the resource map based on the detected available and unavailable resources and include the resource map in an inter-UE coordination message to the receiving UE (e.g., a second UE). The first UE and the second UE may configure (e.g., negotiate) a resource selection window and/or a resource size. The resource selection window may be defined as [n+T1, n+T2], where n, T1, and T2 may be configured (e.g., negotiated as described herein) via PC5-RRC signaling between the first UE and the second UE. In addition, the resource selection window may be configured to be periodic (e.g., with a configurable/negotiable periodicity) and/or a single instance. Further, the resource size may define how many sub-channels the second UE will use for resource selection and/or indicate a granularity of available resources.

Figure 12B:
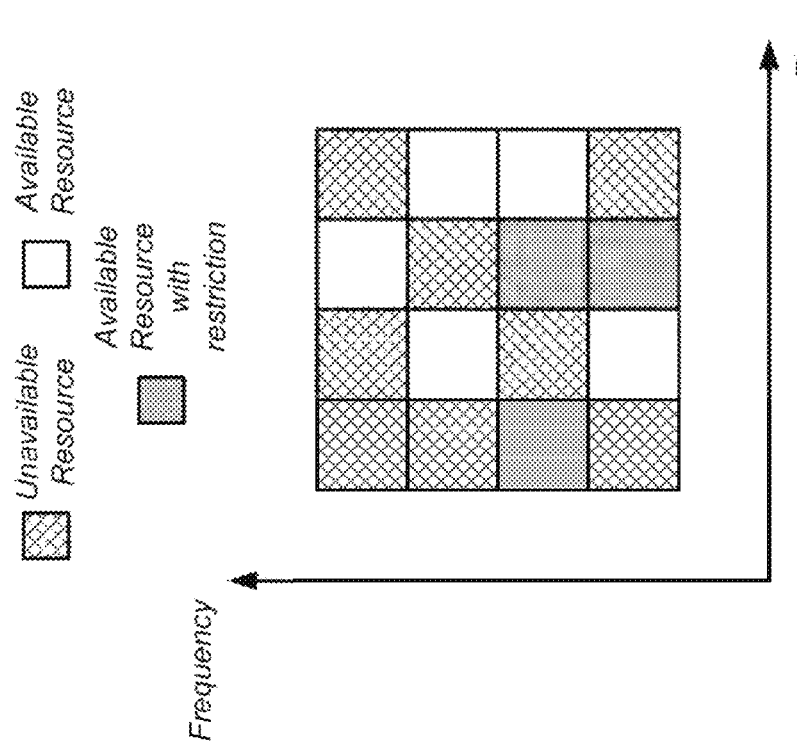
FIGS. 12A-B and 13A-B illustrate examples of resource maps, according to some embodiments.
Figure 12A:
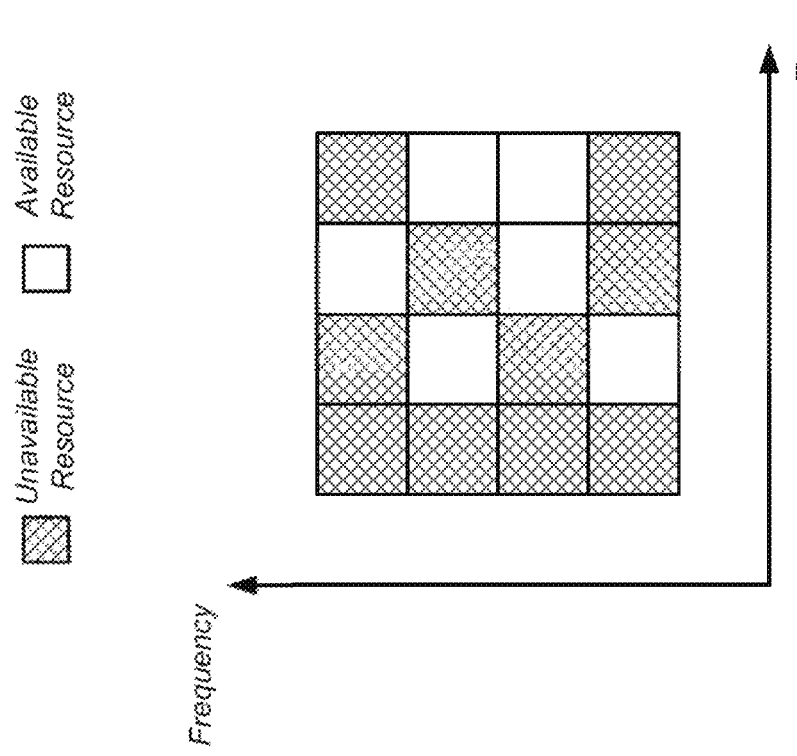
Figure 13B:
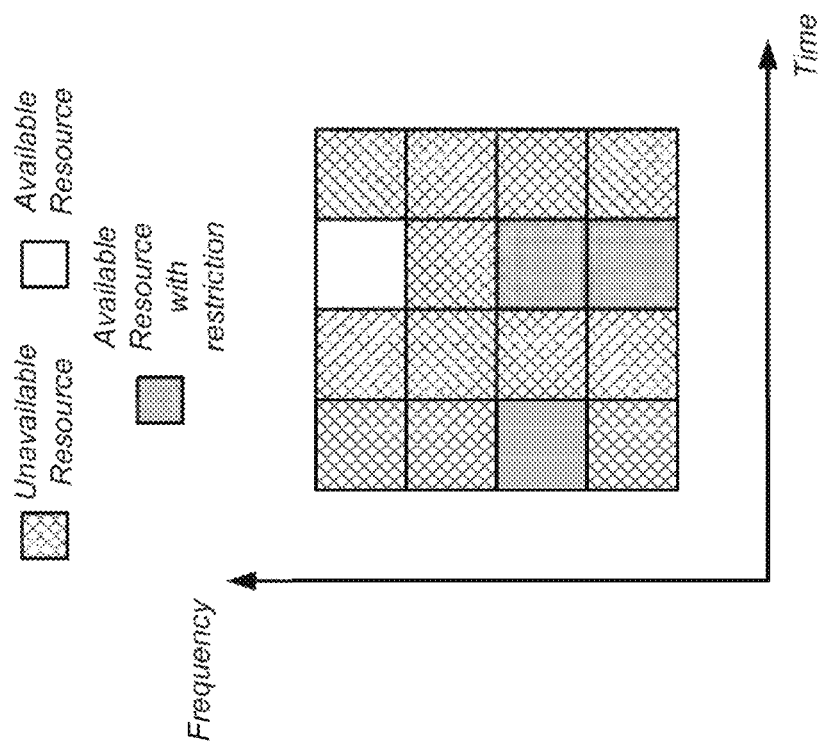
Figure 13A:
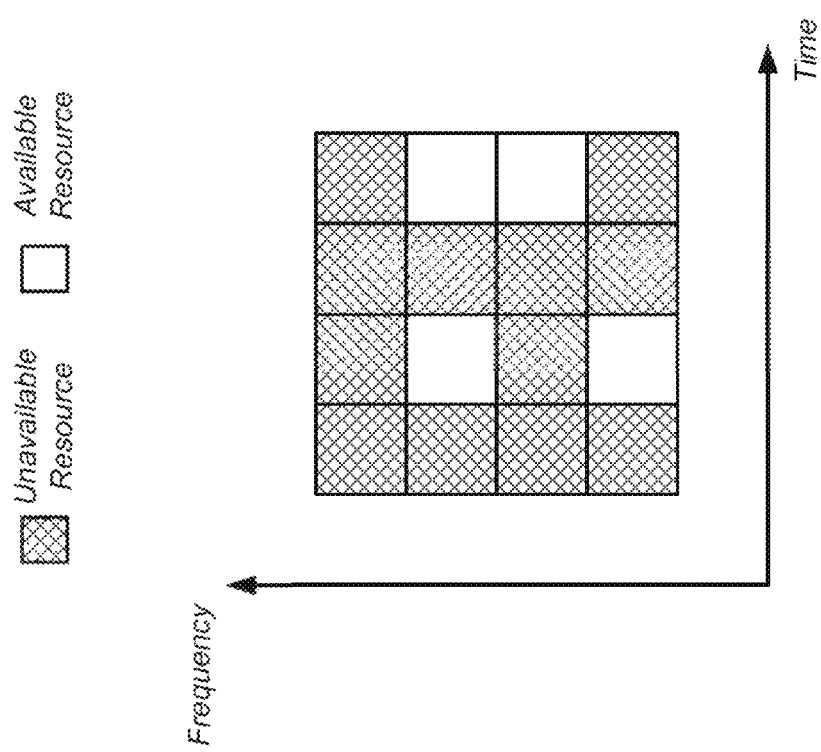

FIGS. 12A-B and 13A-B illustrate examples of resource maps, according to some embodiments. As shown in FIGS. 12A and 13A, a resource map may indicate resources as available or unavailable, where each resource corresponds to a time slot and sub-channel. Alternatively, as shown in FIGS. 12B and 13B, a resource map may indicate resources as available, available with restrictions, or unavailable.

In some embodiments, a bitmap may be included in an inter-UE coordination message, where a first state (e.g., '0') may indicate a resource as unavailable and a second state (e.g., '1") may indicate the resource as available. The bitmap may be a time-frequency bitmap or a frequency-time bitmap. For example, referring back to the resource map of FIG. 12A, a time-frequency bitmap corresponding to the illustrated resource map may be "0100, 0011, 0101, 0010." As another example, also referring back to the resource map of FIG. 12A, a frequency-time bitmap corresponding to the illustrated resource map may be "0000, 1010, 0101, 0110."

In some embodiments, more than one bit may be used to indicate resource availability level, where a first state (e.g., '00') may indicate a resource as unavailable, a second state (e.g., '01') may indicate a resource as available with restrictions, and a third state (e.g., '10') may indicate a resource as available without restrictions. Note that restrictions may include interference on the resource or quality of service (QOS) limitations (e.g., resource is not suitable for higher QoS requirements). The bitmap may be a time-frequency bitmap or a frequency-time bitmap. For example, referring back to the resource map of FIG. 12B, a time-frequency bitmap corresponding to the illustrated resource map may be "00100100, 01000110, 00100010, 00001000." As another example, also referring back to the resource map of FIG. 12B, a frequency-time bitmap corresponding to the illustrated resource map may be "00010000, 10001000, 01010010, 00101000."

In some embodiments, a compressed bitmap may be included in an inter-UE coordination message to indicate a resource set. For example, a first part of the compressed bitmap may indicate whether a slot includes available sub-channels. The first part may be N bits, where N corresponds to a configured (and/or negotiated) and/or indicated resource selection window size. Note that in some embodiments, some slots may not be available due to half-duplex conditions, e.g., as described herein. Further, a second part of the compressed bitmap may indicate available sub-channels for indicated available slots. For example, referring back to the resource map of FIG. 13A, a compressed bitmap corresponding to the illustrated resource map may be "0101, 1010, 0110." Note further that such a scheme may be extended to include multiple bits for each sub-channel, e.g., to indicate resource availability level. For example, referring back to the resource map of FIG. 13B, a compressed bitmap corresponding to the illustrated resource map may be "1010, 00010000, 01010010."

In some embodiments, a coordinating UE (e.g., a first UE, such as UE 106) may include detailed resources in an inter-UE coordination message. For example, the first UE (e.g., coordinating UE) may indicate a few preferred resources, e.g., not an entire resource availability map. In such instances, a number of resources indicated by first UE may be larger than an actual number of resources used by a receiving UE (e.g., a second UE, such as UE 106). The second UE (e.g., receiving UE) may select among the indicated resources. In some embodiments, the indicated resources may be ranked based on a preference level.

In some embodiments, an inter-UE coordination message may include a number of available resources and an indication of time-frequency of the available resources. The indication of time-frequency may be independently encoded resource indications, e.g., such as (t1, f1), (t2, f2), (t3, f3), wherein t1 is a time gap between an indicated resource and the inter-UE message and f1 is a sub-channel index of the indicated resource. Alternatively, and/or in addition, the indication of time-frequency may be jointly encoded resource indications, e.g., time resource indication value (TRIV) of time gaps (t1, t2) between indicated resources and the inter-UE coordination message and frequency resource indication value (FRIV) of sub-channel indices (f1, f2). In some embodiments, the inter-UE coordination message may include indices of pre-candidate resources, e.g., as indicated in a sidelink coordination resource message received from the second UE.

In some embodiments, periodicity of transmission of an inter-UE coordination message may be based, at least in part, on associated triggering conditions. For example, when receiving a sidelink coordination request message, a coordinating UE (e.g., a first UE such as UE 106) may send an inter-UE coordinating message based on contents of the sidelink coordination request message. In some instances, the sidelink coordination request message may include a periodicity of resources. Thus, the first UE (e.g., coordinating UE) may determine a periodicity of transmission of the inter-UE coordinating message based on the periodicity of the resources. As another example, transmission of an inter-UE coordination message may be aperiodic, e.g., based on when triggering conditions are satisfied for the first UE to transmit an inter-UE coordination message. As a further example, when the first UE is a local coordinating UE (e.g., coordinating sidelink communications for one or more other UEs), the first UE may broadcast, groupcast, multicast, and/or unicast an inter-UE coordination message periodically.

In some embodiments, a resource selection window for transmitting the inter-UE coordination message may be determined based, at least in part, on a packet delay budget (PDB). The PDB may depend on a collision time and/or a half-duplex restriction time of the second UE detected by the first UE. For example, if and/or when a resource collision slot or half-duplex restriction slot is detected, a first UE (e.g., a coordinating UE, such as UE 106) may notify a second UE (e.g., another UE 106) before this occurs, with an allowance for the second UE's processing time (e.g., for reception of the inter-UE coordination message or for resource re-selection). Note that the second UE's processing time may be pre-defined and/or pre-configured.

In some embodiments, a data priority, e.g., used in a coordinating UE's (such as UE 106) resource selection procedure, of resources in an inter-UE coordination message may be pre-configured and/or indicated in a sidelink resource request message. For example, if and/or when a sidelink coordination request message includes data priority level, then the coordinating UE may use the data priority level for selecting resources for transmitting the inter-UE coordination message. Alternatively, data priority level may be pre-configured, e.g., per resource pool, and/or configured via negotiations between the coordinating UE (e.g., first UE) and a receiving UE (e.g., a second UE). Note that the negotiations may be via PC5-RRC.

Figure 14:
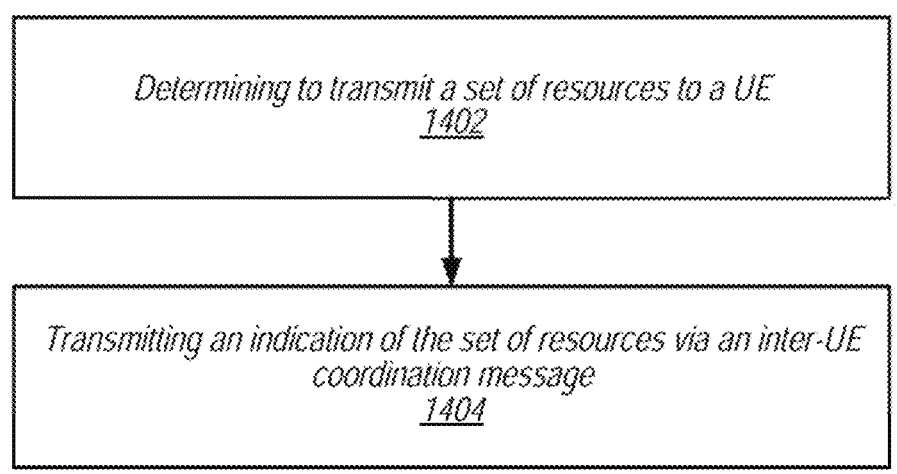
FIG. 14 illustrates a block diagram of an example of a method for providing a set of resources for sidelink communication, according to some embodiments.

FIG. 14 illustrates a block diagram of an example of a method for providing a set of resources for sidelink communication, according to some embodiments. The method shown in FIG. 14 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1402, a first (e.g., coordinating) UE such as UE 106, may determine to transmit, to a second UE (e.g., a source UE), a set of resources for the second UE to use for sidelink communications. Note that the second UE may also be a UE 106. The determination may be based, at least in part, on an occurrence of at least one condition. The at least one condition may include any, any combination of, and/or all of (e.g., at least one of and/or one or more of) the first UE receiving, from the second UE, a sidelink coordination request message (e.g., the inter-UE coordination message may be transmitted in response to receiving the sidelink coordination message), the first UE detecting a resource reservation collision between the second UE and a third UE (e.g., an interfering UE), and/or the first UE detecting of a half-duplex restriction at the second UE or a fourth UE (e.g., a destination UE). The set of resources may allocate resources for the second UE to transmit on to the first UE or to the fourth UE. The set of resources may be more resources than required by the second UE for sidelink communications.

In some embodiments, the first UE may determine a resource selection window for selecting resources for transmission of the inter-UE coordination message. In some embodiments, a packet delay budget associated with the resource selection window may depend, at least in part, on a resource collision slot or a half-duplex restriction slot. In addition, the first UE may determine a data priority of the inter-UE coordination message. The data priority level may be based, at least in part, on a data priority level of included in a sidelink coordination request message received from the second UE. Alternatively, and/or in addition, the data priority level may be pre-configured and/or configured per resource pool or configured via PC5 radio resource control (RRC) signaling between the first UE and the second UE.

In some embodiments, the sidelink coordination request message may include a triggering signal that includes a single bit indicating triggering of the inter-UE coordination message and/or a multi-bit message indicating one or more criteria for selecting the set of resources. The one or more criteria for selecting the set of resources may include any, any combination of, and/or all of (e.g., at least one of and/or one or more of) a time window for the inter-UE coordination message, a time window for the set of resources, a data priority associated with the set of resources, a number of sub-channels of the set of resources, a periodicity of the set of resources, a cast type of the set of resources, an identifier (ID) of the second UE, and/or a format of the inter-UE coordination message. The format of the inter-UE coordination message may define any, any combination of, and/or all of (e.g., at least one of and/or one or more of) a resource map for selecting the set of resources, preferred resources of the first UE, non-preferred resources of the first UE, and/or latency requirements for the inter-UE coordination message.

In some embodiments, when the sidelink coordination request message is a triggering signal, prior to receiving the sidelink coordination request message, the first UE may configure, with the second UE, criteria for selecting the set of resources and sidelink coordination request message resources. Additionally, when the sidelink coordination request message is a triggering signal, the sidelink coordination request message resources may include one or more symbols at an end of a time slot. The one or more symbols may be frequency division multiplexed with physical sidelink feedback channel (PSFCH) resources. Additionally, the sidelink coordination request message resources may be associated with an identifier (ID) of the first UE and an ID of the second UE. In such instances, the first UE may receive the sidelink coordination request message from the second UE based on the ID of the first UE and the ID of the second UE.

In some embodiments, when the sidelink coordination request message is a multi-bit message, the multi-bit message may be received via a higher layer message transmitted in a physical sidelink shared channel (PSSCH) and/or via a sidelink control information (SCI) stage 2 format. The multi-bit sidelink coordination request message may include a list of pre-candidate resources for the first UE to recommend to the second UE. The list of pre-candidate resources may include resources based on the second UE's resource selection and/or resources that are a superset of resources to be used by the second UE. Thus, the set of resources may be a subset of the pre-candidate resources. In such instances, the first UE may measure the pre-candidate resources and select the subset of the pre-candidate resources based on the measurements.

In some embodiments, detecting a resource reservation collision between the second UE and a third UE may include any, any combination of, and/or all of (e.g., at least one of and/or one or more of) a collision of physical sidelink control channel (PSCCH) resource reservations, a collision of physical sidelink shared channel (PSSCH) resource reservations, and/or a collision of physical sidelink feedback channel (PSFCH) resource reservations. The resource reservation collision may include at least one of a persistent resource collision and/or interference level from the third UE exceeding a threshold. In some embodiments, detecting a resource reservation collision between the second UE and a third UE may include the first UE determining that a time gap between collided resource reservations and detection time is greater than a threshold. The threshold may be greater than or equal to a response time of the second UE to change resource reservations after receipt of the inter-UE coordination message.

In some embodiments, detection of the half-duplex restriction at the second UE (e.g., the source UE) or the fourth UE (e.g., the destination UE) may include any, any combination of, and/or all of (e.g., at least one of and/or one or more of) the first UE detecting that the second UE intends to transmit to the fourth UE during a time slot in which the fourth UE is unable to receive transmissions, the first UE detecting that the second UE intends to transmit to the fourth UE during a time slot the second UE is scheduled to receive sidelink data from a fifth UE (e.g., another UE), and/or the first UE detecting that the fourth UE has reserved physical sidelink control channel (PSCCH) and/or physical sidelink shared channel (PSSCH) resources in a time slot in which the second UE has reserved transmission resources to transmit to the fourth UE. In some embodiments, detecting the half-duplex restriction at the second UE or the fourth UE may include the first UE determining that a time gap between the half-duplex restriction and detection time is greater than a threshold. The threshold may be greater than or equal to a response time of the second UE to change resource reservations after receipt of the inter-UE coordination message.

At 1404, the first UE may transmit, to the second UE, an inter-UE coordination message. The inter-UE coordination message may include at least an indication of the set of resources. In some embodiments, transmitting the inter-UE coordination message may include any, any combination of, and/or all of (e.g., at least one of and/or one or more of) the first UE periodically broadcasting the inter-UE coordination message, periodically groupcasting the inter-UE coordination message, and/or periodically unicasting the inter-UE coordination message.

In some embodiments, the set of resources may be indicated via one or more bitmaps, e.g., included in the inter-UE coordination message. In some embodiments, a bit within a bitmap may indicate availability of a resource within the set of resources as available or unavailable. Additionally, the bit within a bitmap may correspond to a time slot and sub-channel combination. In some embodiments, more than one bit within a bitmap may indicate a level of availability of a resource within the set of resources. Additionally, bits may correspond to a time slot and sub-channel combination. Further, the level of availability of a resource may include one or more of available, available with restrictions, or unavailable. In some embodiments, each bitmap of the one or more bitmaps may indicate resource availability for a time slot and one or more bits within each bitmap may indicate resource availability for a sub-channel during the time slot. In other words, each bitmap may indicate sub-channel availability for a time slot. In some embodiments, each bitmap of the one or more bitmaps may indicate resource availability for a sub-channel and one or more bits within each bitmap may indicate resource availability during a time slot on the sub-channel. In other words, each bitmap may indicate time slot availability for a sub-channel.

In some embodiments, the set of resources may be indicated via a bitmap that may include a first portion and a second portion. For example, bits within the first portion may indicate whether a time slot includes available sub-channels and bits within the second portion may indicate available sub-channels for time slots with available sub-channels. In some embodiments, availability of each sub-channel within a time slot may be indicated via a bit, where the bit indicates a sub-channel as available or unavailable. In some embodiments, a level of availability of each sub-channel within a time slot may be indicated via more than one bit, where levels of availability may include available, available with restrictions, or unavailable. As another example, bits within the first portion may indicate whether a sub-channel includes available time slots and bits within the second portion may indicate available time slots for sub-channels with available time slots. In some embodiments, availability of each time slot within a sub-channel may be indicated via a bit, wherein the bit indicates a time slot as available or unavailable. In some embodiments, a level of availability of each time slot within a sub-channel may be indicated via more than one bit, where levels of availability may include available, available with restrictions, or unavailable.

In some embodiments, the set of resources may indicate a set of preferred resources. The set of preferred resources may be a subset of resources available in a resource selection window. The resources within the set of preferred resources may be ranked in order of preference, where higher ranked resources are preferred over lower ranked resources.

In some embodiments, the inter-UE coordination message may further include an indication of a number of available resources within the set of resources and/or an indication of a time-frequency of available resources. The time-frequency of available resources may be independently encoded resource indications or jointly encoded resource indications. The independently encoded resource indications may include a time gap between an indicated resource and the inter-UE coordination message and a sub-channel index of the indicated resource. The jointly encoded resource indications may include a time resource indication value (TRIV) of time gaps between indicated resources and the inter-UE coordination message and a frequency resource indication value (FRIV) of sub-channel indices.

In some embodiments, pre-candidate resources may be indicated by the second UE, e.g., prior to the first UE transmitting the inter-UE coordination message. In such instance, the inter-UE coordination message may include an indication of the pre-candidate resources. The indication of the pre-candidate resources may include indices of the pre-candidate resources.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A first user equipment device (UE), comprising:
   at least one antenna;
   at least one radio, wherein the at least one radio is configured to perform wireless communication using at least one radio access technology (RAT);
   one or more processors coupled to the at least one radio, wherein the one or more processors and the at least one radio are configured to perform voice and/or data communications; and
   wherein the one or more processors are configured to cause the first UE to:
     determine, based on an occurrence of at least one condition, to transmit, to a second UE, a set of resources for the second UE to use for sidelink communications, wherein the at least one condition includes receiving a single bit message indicating triggering of an inter-UE coordination message or receiving a multi-bit message indicating one or more criteria for selecting the set of resources, wherein the multi-bit message includes a list of pre-candidate resources for the first UE to recommend to the second UE, wherein the list of pre-candidate resources includes at least one of resources based on a resource selection by the second UE or resources that are a superset of resources to be used by the second UE, and wherein the set of resources are a subset of the pre-candidate resources;
     measure the pre-candidate resources;
     select the subset of the pre-candidate resources based on the measurements; and
     generate instructions to transmit, to the second UE, an inter-UE coordination message, wherein the inter-UE coordination message includes at least an indication of the set of resources.

2. The first UE of claim 1,
   wherein the at least one condition includes one or more of:
     receiving, from the second UE, a sidelink coordination request message, wherein the inter-UE coordination message is transmitted in response to receiving the sidelink coordination request message, and wherein the sidelink coordination request message includes at least one of:
       the triggering signal that includes the single bit indicating triggering of the inter-UE coordination message; or
       the multi-bit message indicating the one or more criteria for selecting the set of resources;
     detecting a resource reservation collision between the second UE and a third UE; or
     detecting of a half-duplex restriction at the second UE or at a fourth UE.

3. The first UE of claim 2,
   wherein the sidelink coordination request message is a triggering signal, and wherein prior to receiving the sidelink coordination request message, the one or more processors are further configured to cause the first UE to:
     configure, with the second UE, criteria for selecting the set of resources and sidelink coordination request message resources, wherein the sidelink coordination request message resources include one or more symbols at an end of a time slot, wherein the one or more symbols are frequency division multiplexed with physical sidelink feedback channel (PSFCH) resources, and wherein the sidelink coordination request message resources are associated with an identifier (ID) of the first UE and an ID of the second UE; and
     receive, from the second UE, the sidelink coordination request message based on the ID of the first UE and the ID of the second UE.

4. The first UE of claim 1,
   wherein the multi-bit message is received via a higher layer message transmitted in a physical sidelink shared channel (PSSCH) or a sidelink control information (SCI) stage 2 format; and
   wherein the one or more criteria for selecting the set of resources includes at least one of:
     a time window for the inter-UE coordination message;
     a time window for the set of resources;
     a data priority associated with the set of resources;
     a number of sub-channels of the set of resources;
     a periodicity of the set of resources;
     a cast type of the set of resources;
     an identifier (ID) of the fourth UE; or
     a format of the inter-UE coordination message, wherein the format of the inter-UE coordination message defines one or more of:
       a resource map for selecting the set of resources;
       preferred resources of the second UE;
       non-preferred resources of the second UE; or
       latency requirements for the inter-UE coordination message.

5. The first UE of claim 2,
   wherein the resource reservation collision between the second UE and a third UE includes at least one of:
     a collision of physical sidelink control channel (PSCCH) physical sidelink shared channel (PSSCH) resource reservations; or
     a collision of physical sidelink feedback channel (PSFCH) resource reservations.

6. The first UE of claim 2,
   wherein the resource reservation collision includes at least one of a persistent resource collision or interference level from the third UE exceeding a threshold.

7. The first UE of claim 2,
   wherein, to detect the resource reservation collision between the second UE and the third UE, the one or more processors are further configured to cause the first UE to determine that a time gap between collided resource reservations and detection time is greater than a threshold, and wherein the threshold is greater than or equal to a response time of the second UE to change resource reservations after receipt of the inter-UE coordination message.

8. The first UE of claim 2,
wherein, to detect the half-duplex restriction at the second UE or the fourth UE, the one or more processors are further configured to cause the first UE to perform at least one of:
  detecting that the second UE intends to transmit to the fourth UE during a time slot in which the fourth UE is unable to receive transmissions, that the second UE intends to transmit to the fourth UE during a time slot the second UE is scheduled to receive sideline data from a fifth UE, or the half-duplex restriction is on physical sidelink control channel (PSCCH)/physical sidelink shared channel (PSSCH) or on physical sidelink feedback channel (PSFCH); or
  determining that a time gap between the half-duplex restriction and detection time is greater than a threshold, wherein the threshold is greater than or equal to a response time of the second UE to change resource reservations after receipt of the inter-UE coordination message.

9. The first UE of claim 1,
wherein the one or more processors are further configured to cause the first UE to:
  determine a resource selection window for selecting resources for transmission of the inter-UE coordination message, wherein a packet delay budget associated with the resource selection window depends, at least in part, on a resource collision slot or a half-duplex restriction slot; and
  to determine a data priority of the inter-UE coordination message, wherein the data priority is based, at least in part, on a data priority level included in a sidelink coordination request message received from the second UE, pre-configured per resource pool, configured per resource pool, or configured via PC5 radio resource control signaling between the first UE and the second UE.

10. An apparatus, comprising:
a memory; and
at least one processor in communication with the memory, wherein the at least one processor is configured to:
  determine, based on an occurrence of at least one condition, to transmit, to a user equipment device (UE), a set of resources for the UE to use for sidelink communications, wherein the at least one condition includes receiving a single bit message indicating triggering of an inter-UE coordination message or receiving a multi-bit message indicating one or more criteria for selecting the set of resources, wherein the multi-bit message includes a list of pre-candidate resources for the first UE to recommend to the second UE, wherein the list of pre-candidate resources includes at least one of resources based on a resource selection by the second UE or resources that are a superset of resources to be used by the second UE, and wherein the set of resources are a subset of the pre-candidate resources;
  measure the pre-candidate resources; and
  select the subset of the pre-candidate resources based on the measurements; and
  generate instructions to transmit, to the UE, an inter-UE coordination message, wherein the inter-UE coordination message includes at least an indication of the set of resources.

11. The apparatus of claim 10,
wherein the at least one condition includes one or more of:
  receiving, from the UE, a sidelink coordination request message, wherein the inter-UE coordination message is transmitted in response to receiving the sidelink coordination request message, and wherein the sidelink coordination request message includes at least one of:
    the triggering signal that includes the single bit indicating triggering of the inter-UE coordination message; or
    the multi-bit message indicating the one or more criteria for selecting the set of resources;
  detecting a resource reservation collision between UE and a second UE; or
  detecting of a half-duplex restriction at the UE or at a third UE.

12. The apparatus of claim 11,
wherein the sidelink coordination request message is a triggering signal, and wherein prior to receiving the sidelink coordination request message, the at least one processor is further configured to:
  configure, with the UE, criteria for selecting the set of resources and sidelink coordination request message resources; and
  receive, from the UE, the sidelink coordination request message based on an identifier (ID) of the apparatus and an ID of the UE.

13. The apparatus of claim 12,
wherein the sidelink coordination request message resources include one or more symbols at an end of a time slot, wherein the one or more symbols are frequency division multiplexed with physical sidelink feedback channel (PSFCH) resources.

14. The apparatus of claim 13,
wherein the sidelink coordination request message resources are associated with an identifier (ID) of the apparatus and an ID of the UE.

15. A method, comprising:
determining, based on an occurrence of at least one condition, to transmit, to a user equipment device (UE), a set of resources for the UE to use for sidelink communications, wherein the at least one condition includes receiving a single bit message indicating triggering of an inter-UE coordination message or receiving a multi-bit message indicating one or more criteria for selecting the set of resources, wherein the multi-bit message includes a list of pre-candidate resources for the first UE to recommend to the second UE, wherein the list of pre-candidate resources includes at least one of resources based on a resource selection by the second UE or resources that are a superset of resources to be used by the second UE, and wherein the set of resources are a subset of the pre-candidate resources;
measuring the pre-candidate resources; and
selecting the subset of the pre-candidate resources based on the measurements; and
transmitting, to the UE, an inter-UE coordination message, wherein the inter-UE coordination message includes at least an indication of the set of resources.

16. The method of claim 15,
wherein the multi-bit message is received via a higher layer message transmitted in a physical sidelink shared channel (PSSCH) or a sidelink control information (SCI) stage 2 format.

17. The method of claim 16,
wherein the one or more criteria for selecting the set of resources includes at least one of:
- a time window for the inter-UE coordination message;
- a time window for the set of resources;
- a data priority associated with the set of resources;
- a number of sub-channels of the set of resources;
- a periodicity of the set of resources;
- a cast type of the set of resources;
- an identifier (ID) of the UE; or
- a format of the inter-UE coordination message.

18. The method of claim 17,
wherein the format of the inter-UE coordination message defines one or more of:
- a resource map for selecting the set of resources;
- preferred resources of the UE;
- non-preferred resources of the UE; or
- latency requirements for the inter-UE coordination message.

19. The method of claim 15,
wherein the multi-bit message includes a list of pre-candidate resources for recommending to the UE;
wherein the list of pre-candidate resources includes at least one of:
- resources based on a resource selection by the UE; or
- resources that are a superset of resources to be used by the UE;

wherein the set of resources are a subset of the pre-candidate resources.

20. The first UE of claim 1,
wherein the multi-bit message is received via a higher layer message transmitted in a physical sidelink shared channel (PSSCH) or a sidelink control information (SCI) stage 2 format.

\* \* \* \* \*